(12) United States Patent
Izuno et al.

(10) Patent No.: US 7,648,415 B2
(45) Date of Patent: Jan. 19, 2010

(54) GAME APPARATUS AND STORAGE MEDIUM STORING GAME PROGRAM

(75) Inventors: Toshiharu Izuno, Kyoto (JP); Atsushi Kaneko, Tokyo (JP); Masataka Sato, Tokyo (JP)

(73) Assignee: Nintendo Co., Ltd., Kyoto (JP)

( * ) Notice: Subject to any disclaimer, the term of this patent is extended or adjusted under 35 U.S.C. 154(b) by 866 days.

(21) Appl. No.: 11/002,622

(22) Filed: Dec. 3, 2004

(65) Prior Publication Data

US 2005/0124401 A1 Jun. 9, 2005

(30) Foreign Application Priority Data

Dec. 8, 2003 (JP) .............................. 2003-408724

(51) Int. Cl.
*G06T 15/70* (2006.01)
(52) U.S. Cl. ........................................ 463/31; 345/474
(58) Field of Classification Search .................. 463/37, 463/42, 25, 30–31; 345/474
See application file for complete search history.

(56) References Cited

U.S. PATENT DOCUMENTS

| | | | |
|---|---|---|---|
| 6,699,123 B2 * | 3/2004 | Matsuura et al. | 463/31 |
| 6,870,537 B2 * | 3/2005 | Kikuchi et al. | 345/474 |
| 2002/0072411 A1 * | 6/2002 | Matsuura et al. | 463/37 |
| 2002/0155889 A1 * | 10/2002 | Miyamoto et al. | 463/32 |
| 2004/0002380 A1 * | 1/2004 | Brosnan et al. | 463/32 |
| 2008/0224411 A1 * | 9/2008 | Georgis | 273/444 |

OTHER PUBLICATIONS

"Kinniku Banzuke (Muscle Ranking) Muscle Wars 21," Dengeki PlayStation vol. 7, No. 18, Media Works, Jul. 13, 2001, pp. 180-181, 5 pages.
"Konami Official Guide, Perfect Series, Kinniku Banzuke (Muscle Ranking) Series, Perfect Guide, First ed." Konami Co., Ltd. Jun. 26, 2000, pp. 39, 58, 5 pages.
"Konami Official Guide, Perfect Series, Kinniku Banzuke (Muscle Ranking) Series Part 2, Perfect Guide, First ed." Konami Co., Ltd., Feb. 28, 2002, pp. 155, 160-161, 6 pages.
"Famicon Tsuushin (Family Computer News)", No. 1 • 2, Jan. 9, 23 issue (published by ASCII Co. Ltd., Jan. 23, 1987, pp. 34-35), with English translation.
"Marukatsu Super Family Computer, vol. 11, Jun. 12 issue" (published by Kadokawa Shoten Publishing Inc., Jun. 12, 1992, pp. 52-53), with English translation.

* cited by examiner

*Primary Examiner*—Peter DungBa Vo
*Assistant Examiner*—Masud Ahmed
(74) *Attorney, Agent, or Firm*—Nixon & Vanderhye P.C.

(57) ABSTRACT

A game apparatus includes a game machine and a game cartridge. On a case of the game machine, operation buttons are provided. On the LCD, game images of a player object and non-player objects in a game space are displayed. For example, a player, by holding the case with both hands and operating the operation buttons, controls a holding action of a left hand and a right hand of the player object. When the player instructs the player object to perform the holding action, if the non-player object exists at a position where the hand of the player object exists, the non-player object is held. In a case that the player object holds the non-player object with one hand, the player object rotates, and by changing the non-player object to be held, the player object can move within the game space. Furthermore, if releasing the hand from it during the rotation, the player object jumps out.

27 Claims, 20 Drawing Sheets

FIG. 6
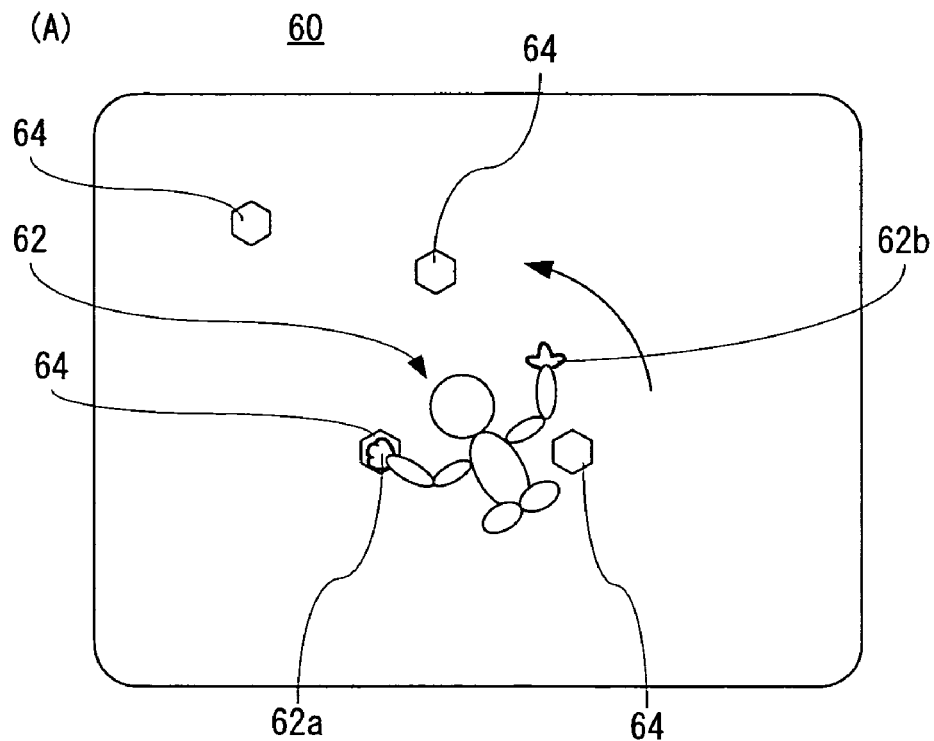
(A)
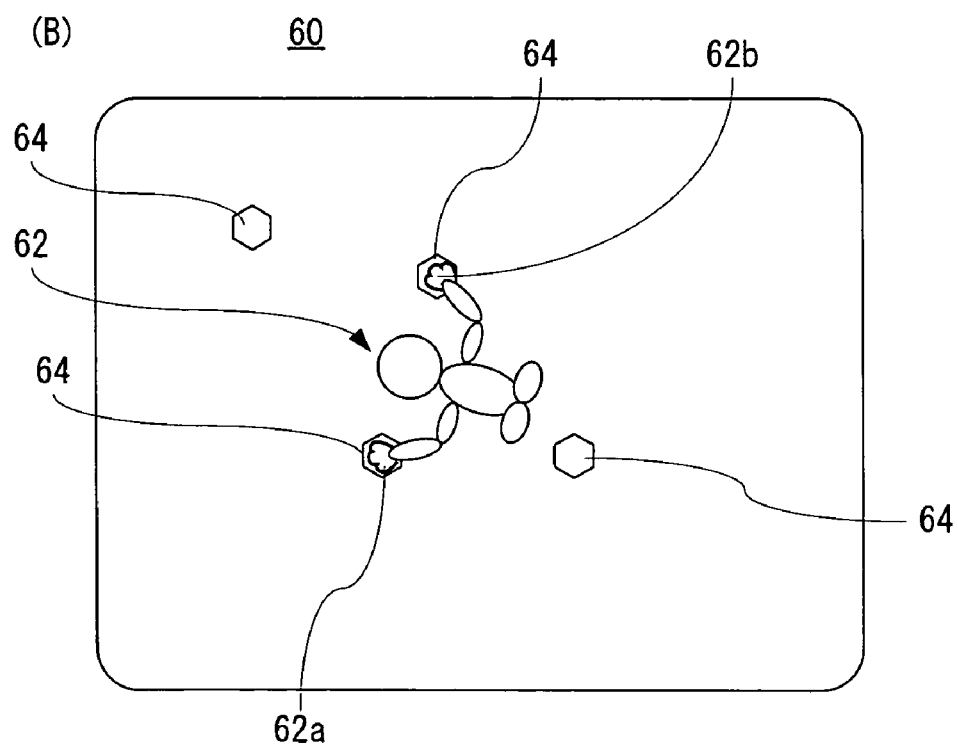
(B)

FIG. 7
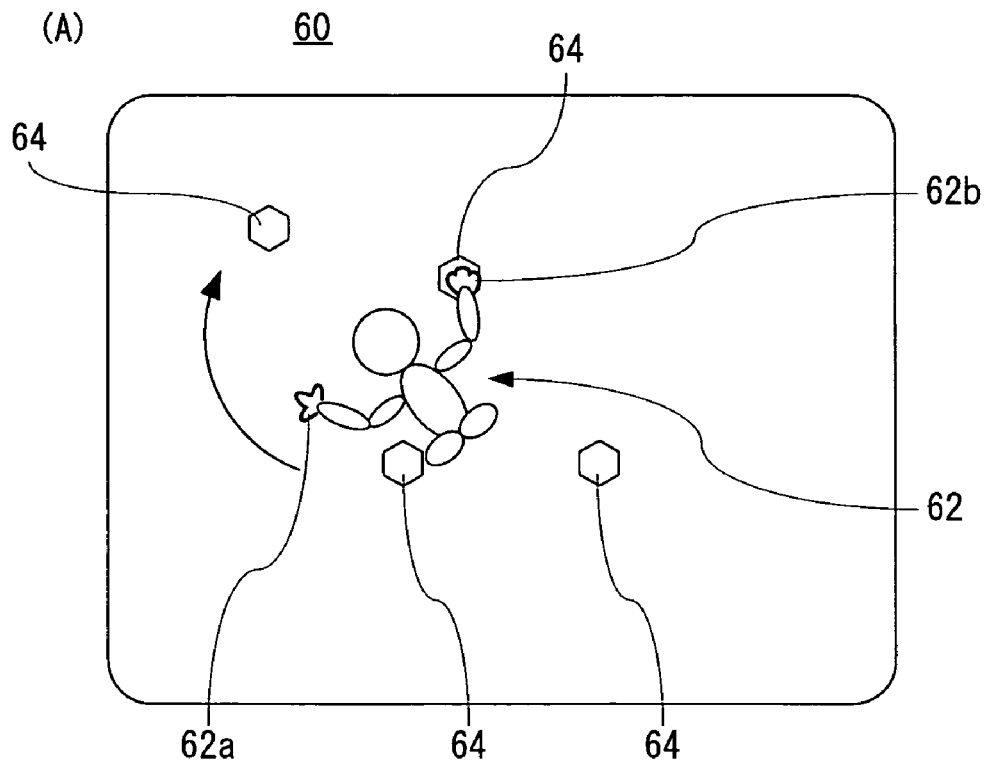
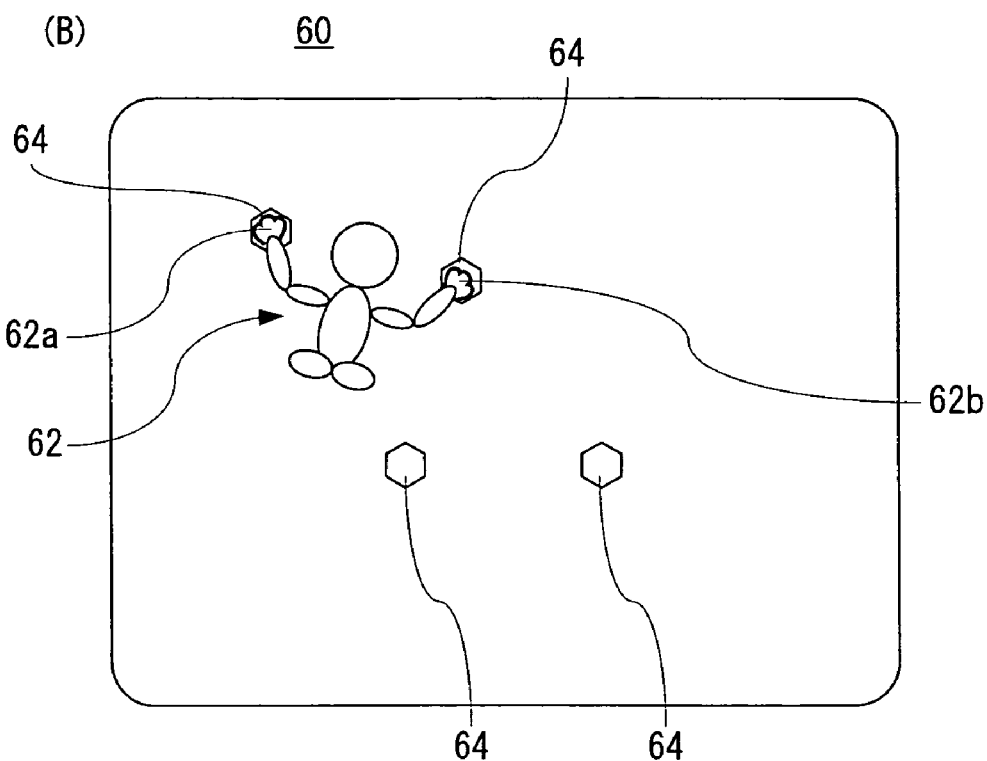

FIG. 11
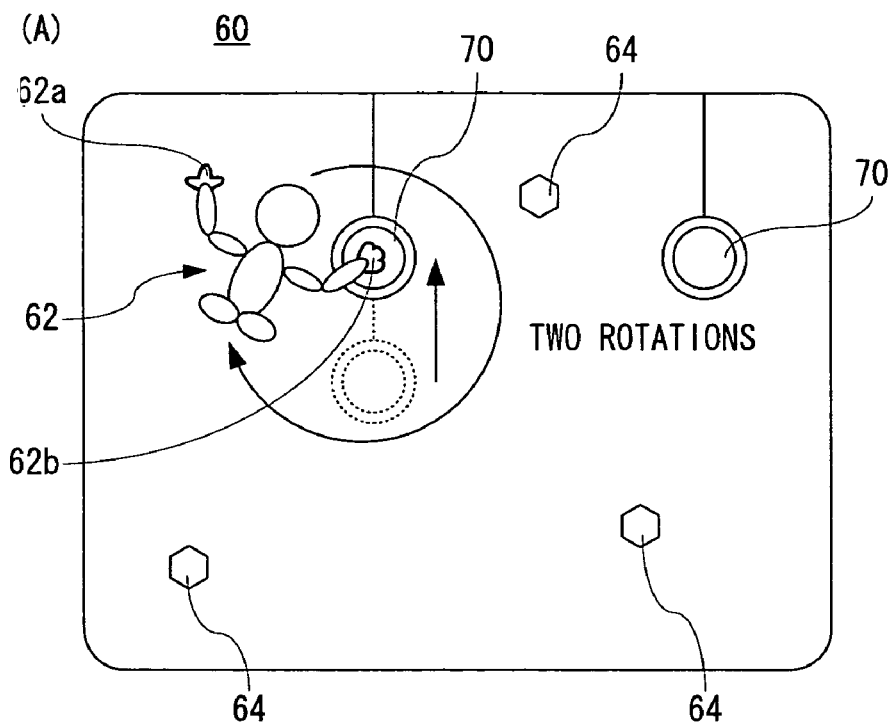
(A)
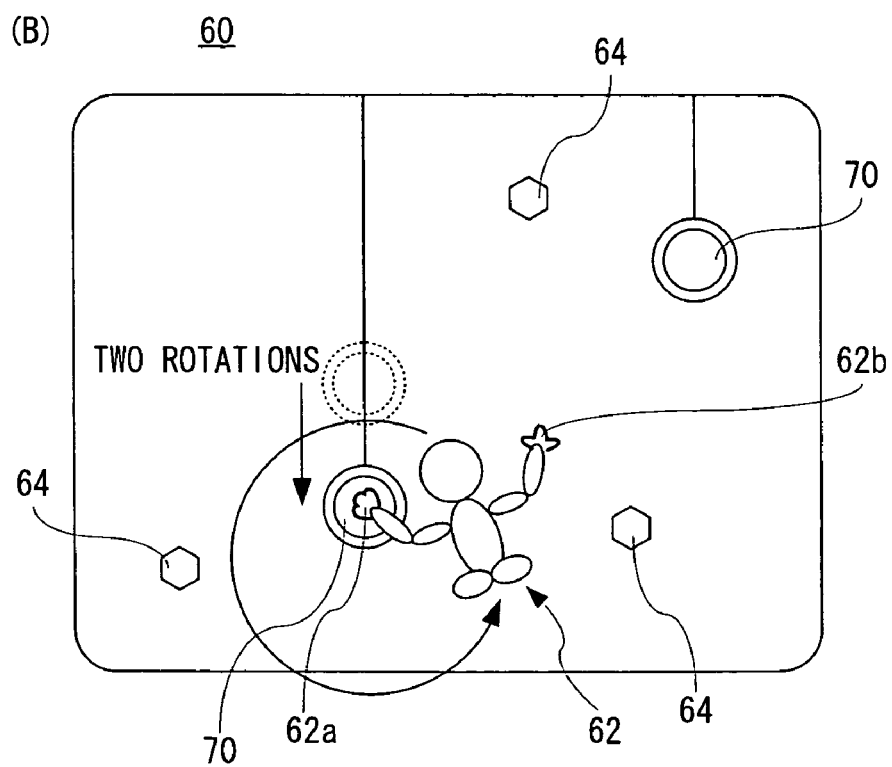
(B)

FIG. 13
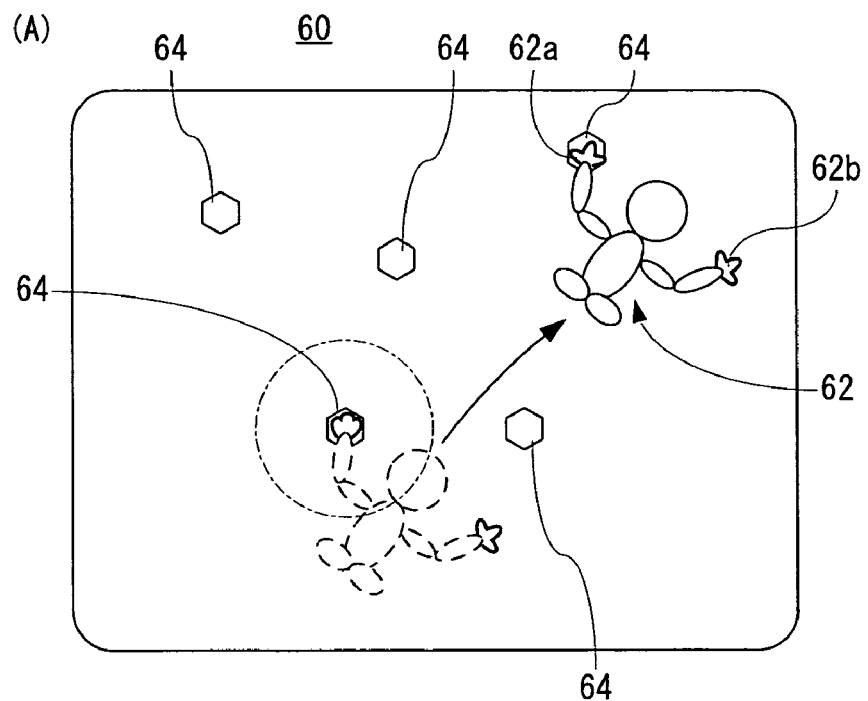
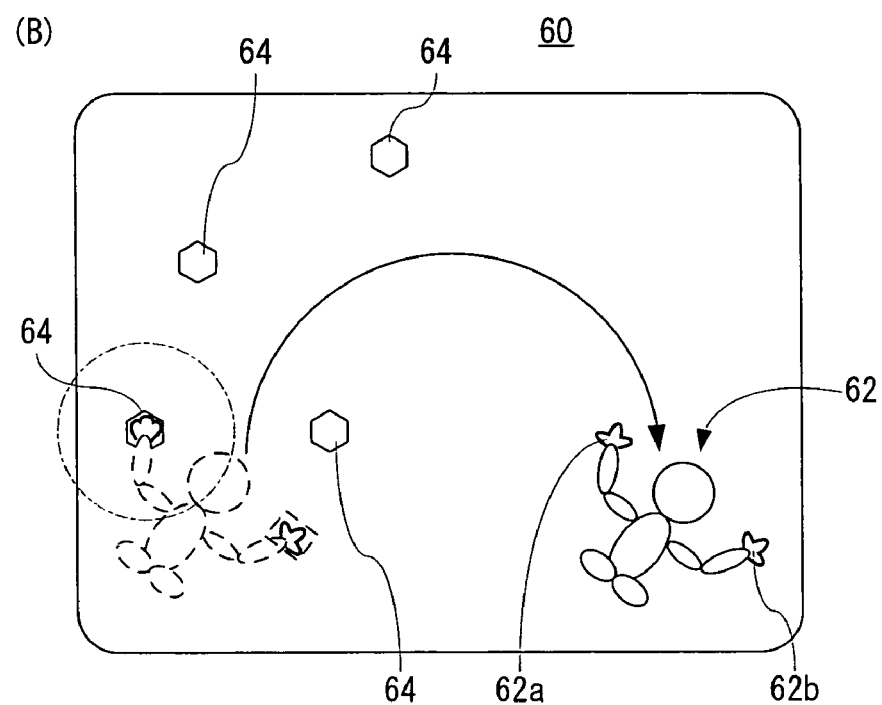

GAME APPARATUS AND STORAGE MEDIUM STORING GAME PROGRAM

TECHNICAL FIELD

The illustrative embodiments relate to game apparatuses and storage mediums storing game programs. More specifically, the illustrative embodiments relate to a game apparatus and a storage medium storing a game program that displays at least a player object and a plurality of non-player objects to be held by the player object within the game space, and moves the player object while rotating the player object and the non-player objects.

BACKGROUND AND SUMMARY OF THE INVENTION

Description of the Prior Art

One example of this kind of a conventional game apparatus is disclosed in "Famicon Tsuushin (Family Computer News), No. 1 • 2 in the January 9, 23 issue" (published by ASCII Co. Ltd., on Jan. 23, 1987, on page 34-35). In the game apparatus of the prior art, a player holds two controllers in each of his or her hands, and moves a player object within a game space by moving the right hand and the left hand of the player object from right to left or up and down in correspondence to the operation of a cross button provided to each of the controllers held in the player's right hand and left hand, and the combination of the operation of each of the controllers.

Another example of this kind of the conventional game apparatus is disclosed in "Marukatsu Super Family Computer, vol. 11 in the June 12 issue" (published by KADOKAWA SHOTEN PUBLISHING Inc., Jun. 12, 1992, page 52-53). In the game apparatus of another prior art, according to an operation by the player, a labyrinth itself, that is, an entire screen is rolled or shaken to carry a ball within the labyrinth to the goal.

However, in the former example, the player object cannot be moved in a desired direction without properly selecting the combination of the operation of the controller to be operated by the right and left hands of the player, resulting in complicated and difficult operation, and failing in obtaining newness of operability. In addition, the player object only moves from right to left or up and down, failing to provide unusual movement of the player object and creating a lack of an interesting game.

In the latter example, the entire screen is rotated or shaken rather than the player object itself, and therefore it is impossible for a player to enjoy a sense of operation obtained from directly operating the player object and the unexpectedness of the movement of the player object.

Furthermore, this prior art does not show that the player object holding a non-player object is rotated, and depending on the number of rotations of the player object, a game image is changed.

Therefore, it is a primary feature of the illustrative embodiments to provide a novel game apparatus and storage medium storing a game program.

Another feature of the illustrative embodiments is to provide a game apparatus and a storage medium storing a game program capable of being operable with newness and ease.

A further feature of the illustrative embodiments is to provide a game apparatus and a storage medium storing a game program capable of enjoying unexpectedness of a movement of a player object.

An additional feature of the illustrative embodiments is to provide a game apparatus and a storage medium storing a game program capable of changing a game image depending on the number of rotations of a player object.

A game apparatus according to an example embodiment presented herein displays game images including at least a player object and a plurality of non-player objects to be held by the player object in a game space. The game apparatus includes an operating means, a first determining means, a second determining means, a right hand action processing means, a left hand action processing means, and a rotation processing means. The operating means has at least a first operating portion and a second operating portion to be operated by a player. The first determining means determines whether or not the non-player object exists at a place where a right hand of the player object exists when the first operating portion is operated by the player. The a second determining means determines whether or not the non-player object exists at a place where a left hand of the player object exists when the second operating portion is operated by the player. The right hand action processing means acts such that the non-player object is held by the right hand of the player object when it is determined that the non-player object exists by the first determining means. The left hand action processing means acts such that the non-player object is held by the left hand of the player object when it is determined that the non-player object exists by the second determining means. Then, the rotation processing means rotates the player object with the hand holding the non-player object taken as a center when the player object holds the non-player object with any one of the hands by the right hand action processing means or the left hand action processing means.

More specifically, the game apparatus (10: a reference numeral corresponding in the "detailed description of the preferred embodiments" described later, and so forth) displays the game images including at least the player object (62) and the plurality of non-player objects (64, 66, 70) to be held by the player object (62) in the game space. In the game apparatus (10), the operating means (16, 18, 20, 22, 24, 26, 28) having at least the first operating portion (28) and the second operating portion (26) to be operated by the player is provided. The first determining means (40, S23) determines whether or not the non-player object (64, 66, 70) exists at a place where the right hand (62b) of the player object (62) exists when the first operating portion (28) is operated. Furthermore, the second determining means (40, S29) determines whether or not the non-player object (64, 66, 70) exists at a place where the left hand (62a) of the player object (62) exists, when the second operating portion (26) is operated. The right hand action processing means (40, S5, S25) acts such that the non-player object (64, 66, 70) is held by the right hand (62b) of the player object (62), when it is determined, by the first determining means (40, S23), that the non-player object (64, 66, 70) exists at a place where the right hand (62b) exists. Furthermore, the left hand action processing means (40, S5, S31) acts such that the non-player object (64, 66, 70) is held by the left hand (62a) of the player object (62) when it is determined, by the second determining means (40, S29), that the non-player object (64, 66, 70) exists at a place where the left hand (62a) exists. The rotation processing means (40, S7, S43, S47) rotates the player object (62), by the right hand action processing means (40, S5, S25) or the left hand action processing means (40, S5, S31), with the hand holding the non-player object (64, 66, 70) taken as the center when the player object (62) holds the non-player object with any one of the hands. By virtue of the rotation, the player object (62) is moved within the game space by changing the non-player object (64, 66, 70) to be held.

According to the illustrative embodiments, by operating any one of the first operating portion and the second operating portion, the player object can be moved while rotating, being easily operable and providing newness to the sense of operation. Furthermore, the player object moves while rotating, and therefore, it is possible to enjoy unexpectedness of the movement of the player object.

In one aspect of the illustrative embodiments, the rotation processing means further comprises a jump processing means for jumping the player object on the basis of a position and a rotation direction of the player object at that time, while the player object is rotated by the rotation processing means when the hand holding the non-player object is released by an operation of the first operating portion or the second operating portion. More specifically, the game apparatus (10) further comprises the jump processing means (40, S1, S125). The jump processing means (40, S11, S125) jumps the player object (62) on the basis of the position and the rotation direction of the player object (62) at that time, while the player object (62) is rotated by the rotation processing means (40, S7, S43, S47) when the hand (62a, 62b) holding the non-player object (64, 66, 70) is released by an operation of the first operating portion (28) or the second operating portion (26). That is, by jumping, the player object (62) can be moved in the game space. Thus, the player object can be moved by jumping out, and the variety of the operation is increased, capable of widely moving the player object.

In another aspect of the illustrative embodiments, a game apparatus further comprises a suspension processing means for suspending the player object at the moment when the player object holds the non-player object with both hands by the right hand action processing means and the left hand action processing means. More specifically, the game apparatus (10) further comprises the suspension processing means (40, S63). The suspension processing means (40, S63) suspends the player object (62) at the moment when the player object (62) holds the non-player object (64, 66, 70) with both hands (62a, 62b) by the right hand action processing means (40, S5, S25) and the left hand action processing means (40, S5, S31). Thus, the player object is suspended at that moment, capable of improving the variety of the operation.

In one aspect of the illustrative embodiments, the operating means further includes a third operating portion, and the suspension processing means suspends a rotation of the player object in response to an operation of the third operating portion, when the player object is rotated by the rotation processing means. More specifically, the operating means (16, 18, 20, 22, 24, 26, 28) further includes the third operating portion (22), and the suspension processing means (40, S63) suspends the rotation of the player object (62) in response to the operation of the third operating portion (22), when the player object (62) is rotated by the rotation processing means (40, S7, S43, S47). That is, the player object can suspend the rotation without holding the non-player object (64, 66, 70) with both hands. Thus, by operating the third operating portion, the rotation of the player object can be suspended, allowing the player to select whether or not to rotate the player object.

In another aspect of the illustrative embodiments, a game apparatus further comprises a fall processing means for making the player object fall when both hands holding the non-player object are released in response to an operation of at least any one of the first operating portion and the second operating portion while the player object is suspended by the suspension processing means, or when a velocity in a vertically upward direction becomes 0 after the player object jumps by the jump processing means. More specifically, the game apparatus (10) further comprises the fall processing means (40, S13, S139). The fall processing means (40, S13, S139) makes the player object (62) fall when the both hands holding the non-player object (64, 66, 70) are released in response to the operation of at least any one of the first operating portion (28) and the second operating portion (26) while the player object (62) is suspended by the suspension processing means (40, S63), or when a velocity in a vertically upward direction of the player object (62) becomes 0 after the player object (62) jumps by the jump processing means (40, S11, S125). Thus, when the player object releases both hands from the non-player object, or when the velocity in the vertically upward direction of the player object after jumping becomes 0, the player object falls, and therefore, the player has a tension of progressing the game by making the player object move with the non-player object in the hand, capable of increasing an interest of the game.

In one aspect of the illustrative embodiments, the rotation processing means includes a rotational velocity changing means for changing a rotational velocity of the player object when at least a predetermined condition according to a progress of the game is satisfied. More specifically, the rotational velocity changing means (40, S59) changes the rotational velocity of the player object (62) when at least the predetermined condition according to the progress of the game is satisfied ("YES" in a S57). For example, depending on the kind of the non-player object (64, 66, 70) to be held or the parameter of the player object (62), the rotational velocity is increased or decreased in speed. Thus, the rotational velocity of the player object is changed, and therefore, in a case the rotational velocity is an initial velocity, it is possible to make a direct a change in a jumping distance, and so forth.

In another aspect of the illustrative embodiments, a game apparatus further comprises a number of rotations detecting means for detecting the number of rotations of the player object, and an image change processing means for providing changes to the game image when the number of rotations detected by the number of rotations detecting means reaches a predetermined number of times. More specifically, the game apparatus (10) includes the number of rotations detecting means (40, S75, S95, S103) and the image change processing means (40, S9, S81, S101, S109). The number of rotations detecting means (40, S75, S95, S103) detects the number of rotations of the player object (62) for every rotation. The image change processing means (40, S9, S81, S101, S109) provides changes to the game image when the detected number of rotations reaches the predetermined number of times. Accordingly, it is possible to prevent the game from being monotonous, capable of increasing an interest of the game.

In one embodiment, the player object is displayed so as to turn its back to the player, and the rotation processing means rotates the player object to the right with the right hand taken as a center when the player object holds the non-player object with the right hand by the right hand action processing means, and rotates the player object to the left with the left hand taken as a center when the player object holds the non-player object with the left hand by the left hand action processing means.

More specifically, the player object (62) is displayed so as to turn its back to the player. The rotation processing means (40, S7, S43, S47) rotates the player object (62) to the right (clockwise) with the right hand (62b) taken as the center when the player object (62) holds the non-player object (64, 66, 70) with the right hand (62b) by the right hand action processing means (40, S5, S25), and rotates the player object (62) to the left (counterclockwise) with the left hand (62*a*) taken as the center when the player object (62) holds the non-player object (64, 66, 70) with the left hand (62*a*) by the left hand action processing means (40, S5, S31). Thus, the rotation direction can be changed depending on the hand of the player object holding the non-player object, capable of providing a surprise to the movement of the player object. Furthermore, the player object is displayed so as to turn its back to the player, and this means that the right and left hands of the player correspond with the right and left hands of the player object, allowing the player to operate the game machine with ease.

In another embodiment, the number of rotations detecting means detects the number of rotations of the player object to the right and to the left, the image change processing means provides a different image change depending on when it is detected that the number of rotations to the right detected by the number of rotations detecting means reaches the predetermined number of times and when it is detected that the number of rotations to the left detected by the number of rotations detecting means reaches the predetermined number of times.

More specifically, the number of rotations detecting means (40, S95, S103) detects the number of rotations of the player object to the right and to the left, and image change processing means (40, S101, S109) provides a different image change depending on when it is detected that the number of rotations to the right detected by the number of rotations detecting means (40, S95, S103) reaches the predetermined number of times and when it is detected that the number of rotations to the left detected by the number of rotations detecting means (40, S95, S103) reaches the predetermined number of times. Therefore, it is possible to increase an interest of the game.

In another aspect, the game apparatus includes a housing formed in a shape capable of being held with both hands, wherein the first operating portion is arranged at a position operable by a finger of the right hand of the player, and the second operating portion is arranged at a position operable by a finger of the left hand of the player. More specifically, the game apparatus (10) includes a housing (12*a*) formed in a shape capable of being held with both hands. The first operating portion (28) is arranged at a position operable by the finger of the right hand of the player, and the second operating portion (26) is arranged at a position operable by the finger of the left hand of the player. That is, the right hand of the player object is arranged corresponding to the fingers of the right hand of the player, and the left hand of the player object is arranged corresponding to the fingers of the left hand of the player, thus, capable of operating the player object in accordance with the hand of the player. This makes it possible to operate the game apparatus with ease, and provide newness to the sense of operation.

Another game apparatus according to the example embodiment displays game images including at least a player object and a plurality of non-player objects to be held by the player object in a game space. The game apparatus includes an operating means, a first determining means, a second determining means, a right hand action processing means, a left hand action processing means, a rotation processing means, the number of rotations detecting means, and an image change processing means. The operating means has at least a first operating portion and a second operating portion to be operated by a player. The first determining means determines whether or not the non-player object exists at a place where a right hand of the player object exists when the first operating portion is operated by the player. The second determining means determines whether or not the non-player object exists at a place where a left hand of the player object exists when the second operating portion is operated by the player. The right hand action processing means acts such that the non-player object is held by the right hand of the player object when it is determined, by the first determining means, that the non-player object exists. The left hand action processing means acts such that the non-player object is held by the left hand of the player object when it is determined, by the second determining means, that the non-player object exists. The rotation processing means rotates at least the player object when the player object holds the non-player object with any one of the hands by the right hand action processing means or the left hand action processing means. The number of rotations detecting means detects the number of rotations of the player object. The image change processing means provides changes to the game image when the number of rotations detected by the number of rotations detecting means reaches a predetermined number of times.

In another game apparatus also, the game image is changed depending on the number of rotations of the player object similarly to the above-described invention of the game apparatus, capable of increasing an interest in the game.

In one embodiment, the rotation processing means rotates the non-player object to the right when the player object holds the non-player object with the right hand by the right hand acting processing means, and rotates the non-player object to the left when the player object holds the non-player object with the left hand by the left hand acting processing means, the number of rotations detecting means detects the number of rotations to the right and the number of rotations to the left of the player object, and the image change processing means provides a different image change depending on when it is detected that the number of rotations to the right, detected by the number of rotations detecting means, reaches the predetermined number of times and when it is detected that the number of rotations to the left, detected by the number of rotations detecting means, reaches the predetermined number of times.

In this embodiment also, the game image is changed differently depending on the rotation direction of the player object similarly to the above-described game apparatus, capable of increasing an interest in the game.

Another game apparatus according to the illustrative embodiments displays game images including at least a player object and a plurality of non-player objects to be held by the player object in a game space. The game apparatus includes an operating means, a determining means, an action processing means, and a rotation processing means. The operating means is operated by a player. The determining means determines whether or not the non-player object exists at a place where a hand of the player object exists when the operating means is operated by the player. The action processing means acts such that the player object holds the non-player object with the hand when it is determined, by the determining means, that the non-player object exists in the same position as the player object hand. The rotation processing means rotates the player object with the hand holding the non-player object taken as a center when the player object holds the non-player object with the hand by the action processing means.

In another game apparatus also, similarly to the above-described game apparatus, the player object can move while rotating, being operable with ease, and providing newness to the sense of operation. Furthermore, the player object moves while rotating, and therefore, it is possible to enjoy unexpectedness of the movement of the player object.

A further game apparatus according to the illustrative embodiments displays game images including at least a player object and a plurality of non-player objects to be held by the player object in a game space. The game apparatus includes an operating means, a determining means, an action processing means, a rotation processing means, the number of rotations detecting means, and an image change processing means. The operating means is operated by a player. The determining means determines whether or not the non-player object exists at a place where a hand of the player object exists when the operating means is operated by the player. The action processing means acts such that the player object holds the non-player object with the hand when it is determined, by the determining means, that the non-player object exists. The rotation processing means rotates at least the player object when the player object holds the non-player object with the hand by the action processing means. The number of rotations detecting means detects the number of rotations of the player object. Then, the image change processing means provides changes to the game image when the number of rotations, detected by the number of rotations detecting means, reaches a predetermined number of times.

In a further game apparatus also, the game image is changed depending on the number of rotations of the player object similarly to the above-described game apparatus, capable of increasing interest in the game.

In a storage medium storing a game program according to another aspect of the preferred embodiments, the storage medium stores a game program of the game apparatus that displays game images including at least a player object and a plurality of non-player objects to be held by the player object in a game space, and is provided with an operating means having at least a first operating portion and a second operating portion to be operated by a player. The game program causes a processor of the game apparatus to execute a first determining step, a second determining step, a right hand action processing step, a left hand action processing step, and a rotation processing step. The first determining step determines whether or not the non-player object exists at a place where a right hand of the player object exists when the first operating portion is operated by the player. The second determining step determines whether or not the non-player object exists at a place where a left hand of the player object exists when the second operating portion is operated by the player. The right hand action processing step acts such that the non-player object is held by the right hand of the player object when it is determined, by the first determining step, that the non-player object exists. The left hand action processing step acts such that the non-player object is held by the left hand of the player object when it is determined, by the second determining step, that the non-player object exists. Then, the rotation processing step rotates the player object, with the hand holding the non-player object taken as a center when the player object holds the non-player object with any one of the hands by the right hand action processing step or the left hand action processing step.

In this aspect of the illustrative embodiments, the storage medium storing the game program, similar to the above-described aspect of the illustrative embodiments, the game apparatus, the player object can be moved while rotating, being operable with ease and providing newness to the sense of operation. Furthermore, the player object moves while rotating, and therefore, it is possible to enjoy unexpectedness of the movement of the player object.

In a storage medium storing a game program according to another embodiment, the storage medium stores a game program of a game apparatus that displays images including at least a player object and a plurality of non-player objects to be held by the player object in a game space, and is provided with an operating means having at least a first operating portion and a second operating portion to be operated by a player. The game program causes the processor of the game apparatus to execute a first determining step, a second determining step, a right hand action processing step, a left hand action processing step, a rotation processing step, the number of rotations detecting step, and an image change processing step. The first determining step determines whether or not the non-player object exists at a place where a right hand of the player object exists when the first operating portion is operated by the player. The second determining step determines whether or not the non-player object exists at a place where a left hand of the player object exists when the second operating portion is operated by the player. The right hand action processing step acts such that the non-player object is held by the right hand of the player object when it is determined, by the first determining step, that the non-player object exists. The left hand action processing step acts such that the non-player object is held by the left hand of the player object when it is determined, by the second determining step, that the non-player object exists. The rotation processing step rotates at least the player object when the player object holds the non-player object with any one of the hands by the right hand action processing step or the left hand action processing step. The number of rotations detecting step detects the number of rotations of the player object. Then, the image change processing step provides changes to the game image when the number of rotations, detected by the number of rotations detecting step, reaches a predetermined number of times.

In this aspect of the illustrative embodiments, the storage medium storing another game program also, the game image is changed depending on the number of rotations of the player object similarly to the above-described invention of the game apparatus, capable of increasing an interest in the game.

In a storage medium storing another game program according to another aspect of the illustrative embodiments, the storage medium stores a game program of a game apparatus that displays game images including at least a player object and a plurality of non-player objects to be held by the player object in a game space, and is provided with an operating means to be operated by a player. The game program causes the processor of the game apparatus to execute a determining step, an action processing step, and a rotation processing step. The determining step determines whether or not the non-player object exists at a place where a hand of the player object exists when the operating means is operated by the player. The action processing step acts such that the non-player object is held by the hand of the player object when it is determined, by the determining step, that the non-player object exists in the same position as the hand of the player object. The rotation processing step rotates the player object, with the hand holding the non-player object taken as the center, when the player object holds the non-player object with the hand by the action processing step.

In a storage medium storing another game program also, similarly to the above-described aspect of the illustrative embodiments, the player object can be moved while rotating, being operable with ease and providing newness to the sense of operation. Furthermore, the player object moves while rotating, and therefore, it is possible to enjoy unexpectedness of the movement of the player object.

In the storage medium storing another game program according to another aspect of the illustrative embodiments, the storage medium stores a game program of a game apparatus that displays game images, including at least a player object and a plurality of non-player objects to be held by the player object, in a game space, and is provided with an operating means to be operated by a player. The game program causes the processor of the game apparatus to execute a determining step, an action processing step, a rotation processing step, the number of rotations detecting step, and an image change processing step. The determining step determines whether or not the non-player object exists at a place where a hand of the player object exists when the operating means is operated by the player. The action processing step acts such that the non-player object is held by the hand of the player object when it is determined, by the determining step, that the non-player object exists. The rotation processing step rotates at least the player object when the player object holds the non-player object in the hand by the action processing step. The number of rotations detecting step detects the number of rotations of the player object. Then, the image change processing step provides changes to the game image when the number of rotations detected by the number of rotations detecting step reaches a predetermined number of times.

In the example embodiment of the storage medium storing another game program also, the game image is changed depending on the number of rotations of the player object similarly to the above-described example embodiment of the game apparatus, capable of increasing an interest in the game.

The above described objects, features, aspects and advantages of the illustrative embodiments will become more apparent from the following detailed description of the illustrative embodiments when taken in conjunction with the accompanying drawings.

BRIEF DESCRIPTION OF THE DRAWINGS

FIG. 6 is an illustrative view showing another example of the game screen displayed on the LCD of the game machine shown in FIG. 1;

FIG. 7 is an illustrative view showing another example of the game screen displayed on the LCD of the game machine shown in FIG. 1;

FIG. 11 is an illustrative view showing a further example of the game screen displayed on the LCD of the game machine shown in FIG. 1;

FIG. 13 is an illustrative view showing another example of the game screen displayed on the LCD of the game machine shown in FIG. 1;

DETAILED DESCRIPTION OF THE PREFERRED EMBODIMENTS

Figure 1:
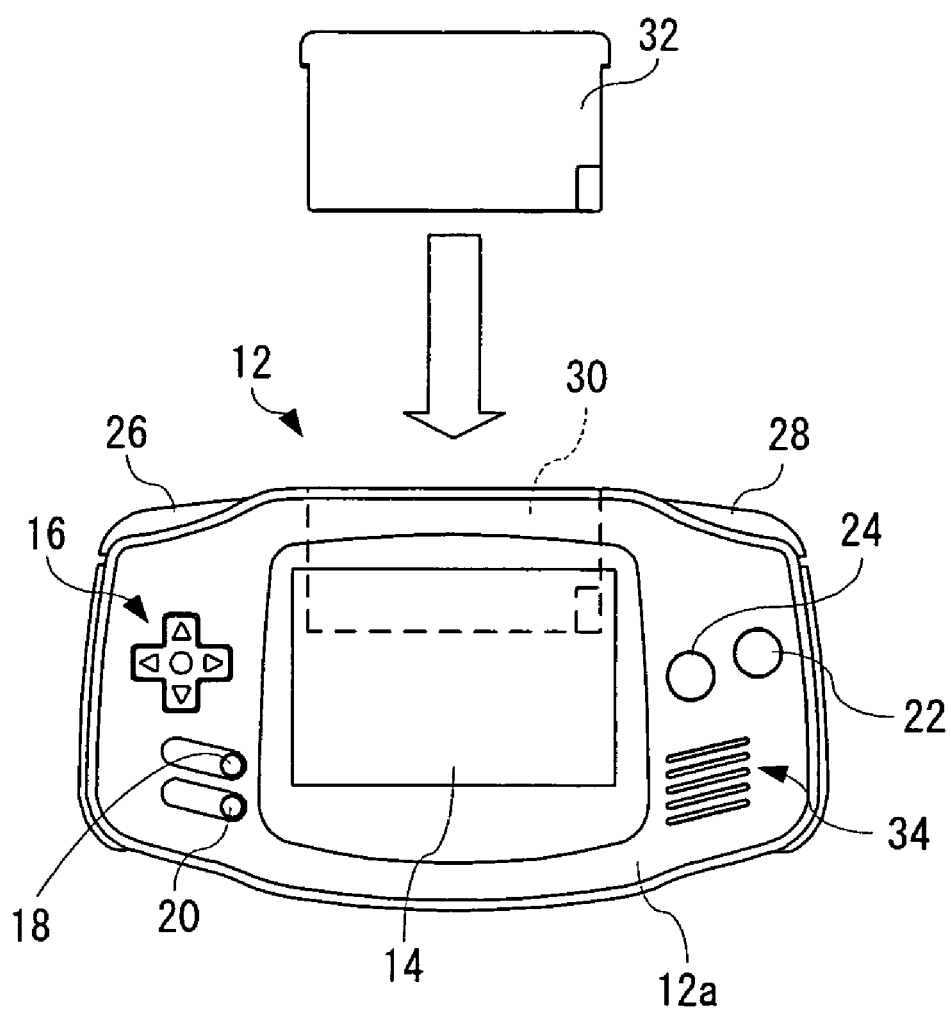
FIG. 1 is an illustrative view showing one example of a game apparatus of the illustrative embodiments.

Referring to FIG. 1, a game apparatus 10 of one embodiment includes a game machine 12. As such the game machine 12, a hand-held type game machine such as GAMEBOY ADVANCE (product name) is applicable. The game machine 12 has, on the surface of a housing (case) 12a thereof, provided with a color liquid crystal display (hereinafter, referred to as "LCD") 14 at an approximate center. On the LCD 14, a game space and game characters appearing in the game space, such as a player character, are displayed, and messages are also displayed as necessary. Also on the surface of the case 12a, operating buttons 16, 18, 20, 22, 24, 26, and 28 are provided. The operating buttons 16, 18 and 20 are placed at the left of the LCD 14, and the operating buttons 22 and 24 are placed at the right of the LCD 14. Furthermore, the operating buttons 26 and 28 are placed at an upper end surface (above the LCD) of the case 12a.

The operating button 16 is a cross button which functions as a digital joystick, and is able to instruct a moving direction of the game characters displayed on the LCD 14 and move a cursor by operating any one of four depression portions. The operating button 18 is a start button formed by a push button, and utilized for instructing the game to start, etc. The operating button 20 is a select button formed by the push button, and utilized for selecting a game mode, etc.

The operating button 22 is an A button formed by the push button, and allows the game character (player object) displayed on the LCD 14 to perform an arbitrary action such as hitting, throwing, holding, jumping, riding, cutting, talking, etc. The operating button 24 is a B button formed by the push button, and utilized for changing to a game mode selected by the select button 20, canceling the action determined by the A button 22, and so forth. The operating button 26 is a left depression button (L button) formed by the push button, and the operating button 28 is a right depression button (R button) formed by the push button. The operating buttons 26 and 28 can perform the same operation as the A button 22 and the B button 24, and also function as a subsidiary of the A button 22 and the B button 24.

Also, on the rear surface of the case 12a at an upper end, a loading slot 30 is provided. Into the loading slot 30, a game cartridge 32 is loaded. Although not illustrated, connectors are respectively provided at a depth portion of the loading slot 30 and at an end portion of the game cartridge 32 in the loading direction, and when the game cartridge 32 is loaded into the loading slot 30, the two connectors are connected with each other. Therefore, the game cartridge 32 is accessible by a CPU 40 of the game machine 12 (see FIG. 2).

Furthermore, on the surface of the case 12a below the A button 22 and the B button 24, a speaker 34 for outputting a game music (BGM), a sound effect, a sound such as voices or onomatopoeic sound of the game character during the game, and so on is provided.

It is noted that although not illustrated, the case 12a is provided with an external expansion connector on its upper surface, a battery accommodating box on its rear surface, and a power switch, a sound level volume, an earphone jack, etc. on its bottom surface.

Figure 2:
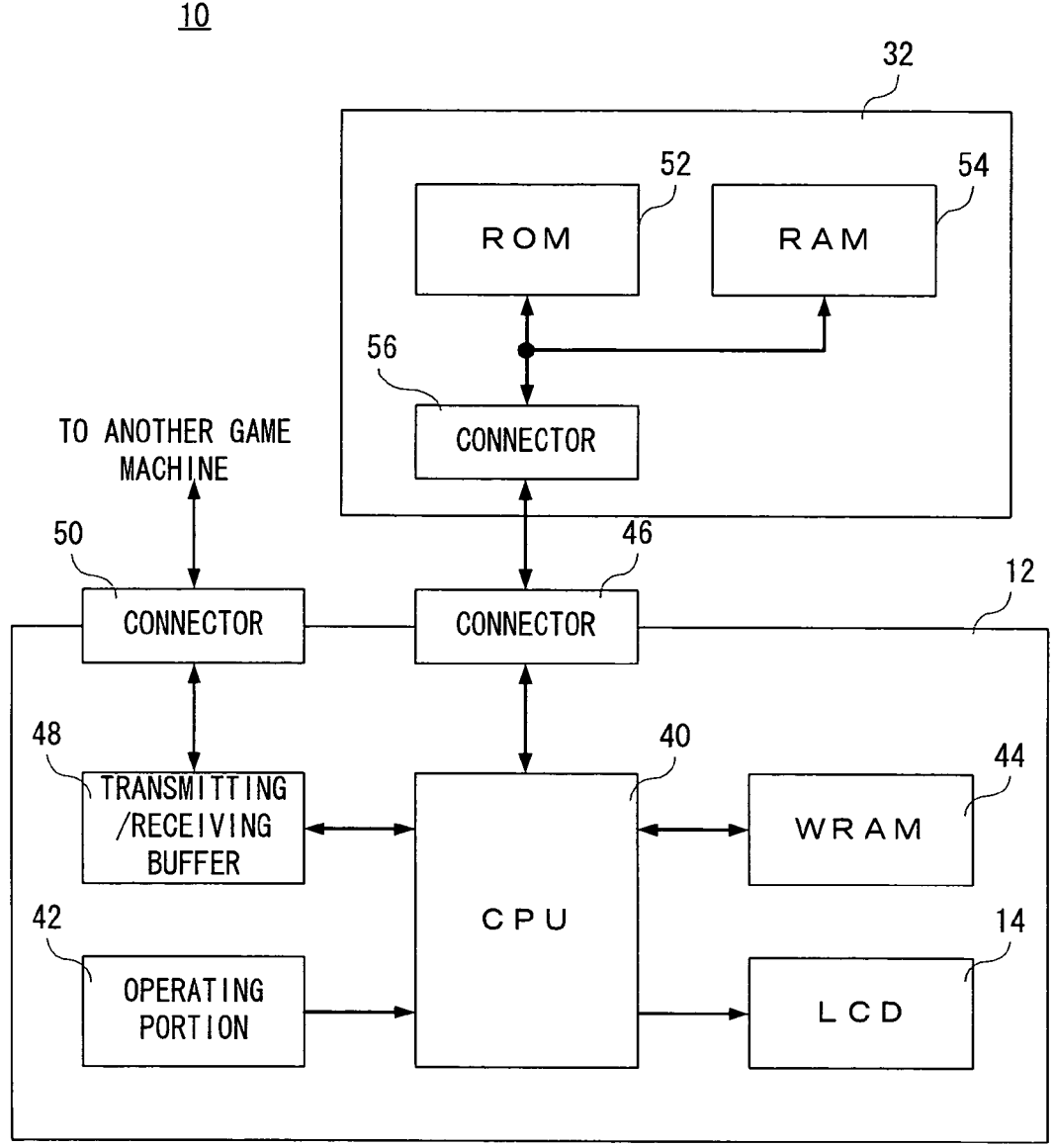
FIG. 2 is a block diagram showing an electric configuration of the game apparatus shown in FIG. 1.

An electric configuration of the game apparatus 10 is shown in FIG. 2. Referring to FIG. 2, the game machine 12 is provided with the CPU 40 as described above. The CPU 40 is also called a computer or a processor, and entirely controls the game machine 12. The CPU 40 or the computer is connected with the above-described LCD 14, an operating portion 42 and a working memory (WRAM) 44 via an internal bus, and also connected with a connector 46 and a transmitting/receiving buffer 48, etc.

The LCD 14 receives display data from the CPU 40 to display a game image (game screen). It is noted that although illustration is omitted, the CPU 40 is connected with, for example, a VRAM, an LCD controller, etc, and under control of the CPU 40, game image data such as background image data, object image data including a player object, a non-player objects, an item objects, etc. are rendered in the VRAM. Herein, the player object is a moving image object whose arbitrary action such as a movement is controlled in response to an operation by the player. The non-player object is a moving image object whose arbitrary action such as movement, etc. is controlled by the computer (CPU 40) rather than in response to an operation by the player. Then, the LCD controller reads the game image data (display data) rendered in the VRAM according to the instruction from the CPU 40 to display a game image on the LCD 14.

The operating portion 42 includes the above-described respective operation buttons 16, 18, 20, 22, 24, 26, 28, and an operation input signal corresponding to an operation of each of these buttons is applied to the CPU 40. Accordingly, the CPU 40 executes a processing according to the instruction by the player (user) through the operating portion 42.

The working memory 44 is a writable/readable memory, and is utilized as a working area or a buffer area of the CPU 40. The transmitting/receiving buffer 48, for example, temporarily stores transmitting/receiving data during a communication play of a multiplayer game, and connects to an external expansion connector 50. By connecting another game apparatus 10 (game machine 12) to the connector 50 with the use of a communication cable not shown, it becomes possible to perform data communications among a plurality of game apparatuses 10.

Although illustration is omitted, the CPU 40 is connected with a speaker 34 shown in FIG. 1 via a sound circuit, and when sound data is applied from the CPU 40 to the sound circuit, sounds necessary for the game such as game music, a sound effect, a sound or onomatopoeic sound of the moving image object, etc. are output from the speaker 34.

The game cartridge 32 is provided with a ROM 52 and a RAM 54, and the ROM 52 and the RAM 54 are connected with each other via a bus, and connected to a connector 56. Therefore, when the game cartridge 32 is loaded into the game machine 12 to connect the connector 46 and the connector 56, the CPU 40 is electrically connected to the ROM 52 and the RAM 54. This allows the CPU 40 to read out predetermined program data from a predetermined area of the ROM 52 to develop it in the working memory 44, read out predetermined backup data to write it in the working memory 44, write to a predetermined area in the RAM 54 the game data, and so on generated in correspondence to the progress of the game in the working memory 44 to store (save) it, and so forth.

It is noted that although as the RAM 54, a flash memory being a non-volatile memory is applicable, another non-volatile memory such as a ferroelectric memory (FeRAM), an EEPROM, etc. is also applicable. Also, an SRAM, a DRAM, and so on can be utilized.

Figure 3:
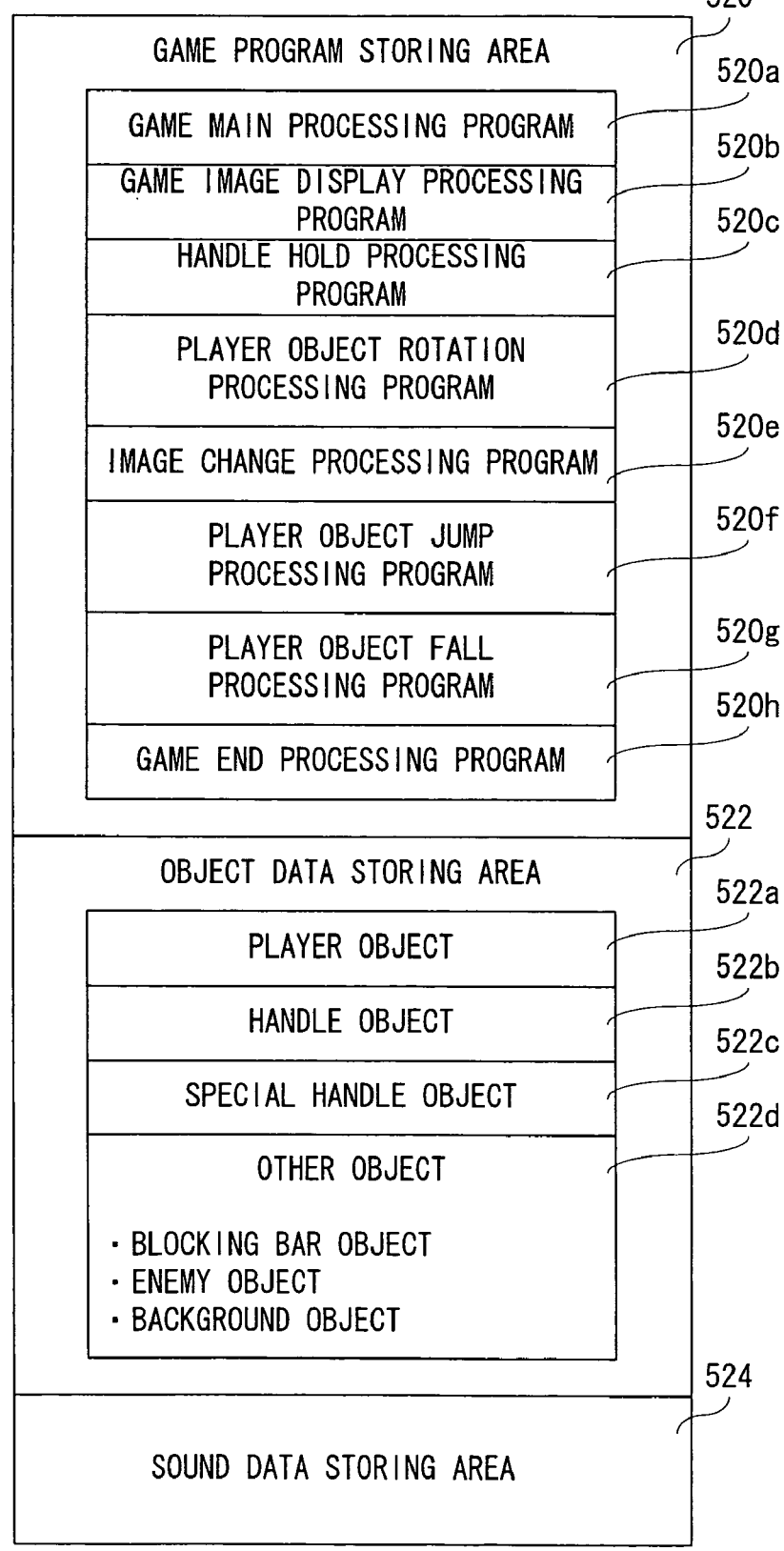
FIG. 3 is an illustrative view showing a memory map of a ROM provided within a game cartridge shown in FIG. 2.

FIG. 3 is an illustrative view showing one example of a memory map of the ROM 52. Referring to FIG. 3, the ROM 52 includes a game program storing area 520, an object data storing area 522, a sound data storing area 524, etc. In the game program storing area 520, a game main processing program 520a, a game image display processing program 520b, a handle hold processing program 520c, a player object rotation processing program 520d, an image change processing program 520e, a player object jump processing program 520f, a player object fall processing program 520g, and a game end processing program 520h, etc. are stored.

The game main processing program 520a is a program for executing the main processing of the game to be executed in the game machine 12 of this embodiment. The game image display processing program 520b is a program for displaying game images such as a player object (moving image object imitating an animal having the arms and legs in this embodiment), non-player objects (moving image object such as an enemy object, a handle, a blocking bar, etc. in this embodiment), background objects, etc., on the LCD 14.

The handle hold processing program 520c is a program for determining whether or not a handle exists at a position where a hand (right hand or left hand) of the player object exists, and causing the player object hold the handle in the hand in a case that the handle exists at the position. It is noted that in a case that the hand does not exist at the position, the process for causing the player object to hold the handle in his hand is not executed.

The player object rotation processing program 520d is a program for rotating the player object together with the handle to the right or left direction when the player object holds the handle in either the left hand and the right hand. In this embodiment, in a case that the player object holds the handle in the left hand, the player object is rotated to the left (counterclockwise) with the left hand taken as the center (the center of the handle, and so forth) while in a case that the player object holds the handle in the right hand, the player object is rotated to the right (clockwise) with the right hand taken as the center.

It is noted that in this embodiment, in order to represent reality, when the player object is rotated by the player object rotation processing program 520d, the handle, that is, the non-player object is also rotated according to the rotation. However, it is appropriate that at least the player object is rotated.

The image change processing program 520e is a program for providing changes to the image when the number of rotations of the player object reaches a predetermined number of times. The changes of the image is described in detail later, and thus, omitted here.

The player object jump processing program 520f is a program for jumping the player object in a case that the player object releases the hand from the handle during rotation. The jumping method, etc are described in detail later, and thus, omitted here.

The player object fall processing program 520g is a program for causing the player object to fall to the downward direction when the player object releases the hand (both hands) from the handle in a state the player object is in a still (stop) state (suspended state), or when the speed to the upper direction becomes 0 after the player object jumps.

The game end processing program 520h is a program for ending the game processing according to the game end or an operation (instruction) by the player.

Although illustration is omitted, in the game program storing area 520, a sound control program for generating and outputting sounds such as a game music, a sound effect, voices or onomatopoeic sounds of the player object by use of the music data to be described later such as sound data, acoustic wave-shaped data, and so on, and a communication control program for controlling the data communications with another game apparatuses 10 (game machines 12), etc. are also stored.

In the object data storing area 522, player object data 522a, handle object data 522b, special handle object data 522c, and other object data 522d are stored. In this embodiment, as the other object, a blocking bar object, an enemy object, a background object, and so on are prepared, and although illustration is omitted, an item object is also prepared. These data 522a-522d are used when executing the above-described game image display processing program 520b to display a game screen including the player object, the handle, the special handle, and other objects on the LCD 14.

That is, the player object data 522a, the handle object data 522b, the special handle object data 522c, and the other object data 522d are image data such as polygon (polygonal plane defined by at least three vertex coordinates) data, texture data, and so on as to the relevant objects.

In the sound data storing area 524, as described above, the music data utilized for generating and outputting the game music, etc. is stored.

Such a game program, object data and music data are read by the CPU 40 entirely at a time, or partially and sequentially so as to be stored (loaded) into the working memory 44. Although illustration is omitted, into the working memory 44, another game data for proceeding the game, game data to be generated in correspondence with the progress of the game (data of game result), flag data, etc. except for the game program, the object data and the music data are stored.

Briefly, in the game of this embodiment, according to an operation by the player, the player object holds the handles arranged in the game space, and moves between the handles by rotating, jumping to aim at a goal prepared in the game space (each screen or each field).

Figure 4:
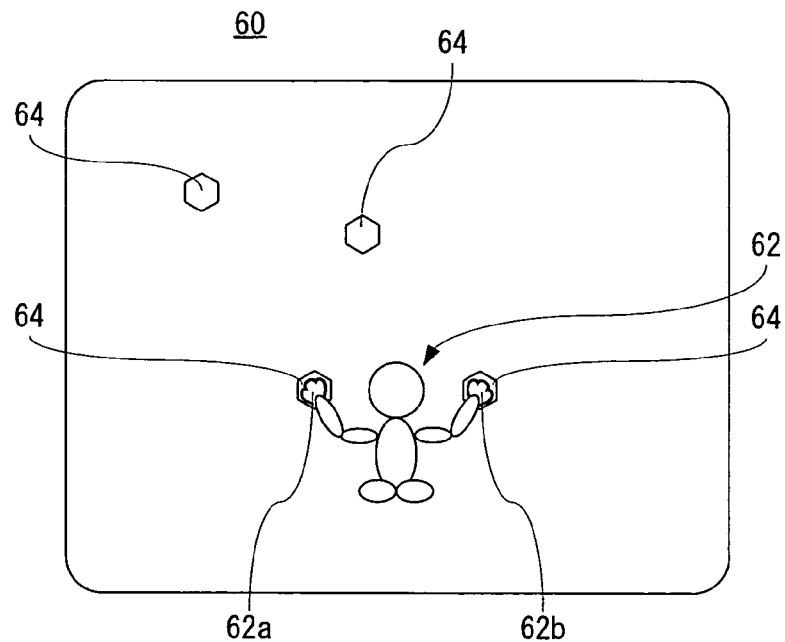
FIG. 4 is an illustrative view showing one example of a game screen displayed on an LCD of the game machine shown in FIG. 1.

Hereafter, with the use of FIG. 4 to FIG. 15, a description is made on an movement, and so on of the player object, and the non-player object (handle, special handle, blocking bar) during the game. FIG. 4 is one example of a game screen 60 to be displayed on the LCD 14, and a state in which a player object 62 holds a handle 64 in each of his left hand 62a and right hand 62b is displayed on the game screen 60. In such the case, the player object 62 is suspended in the position (suspended state).

Although it is difficult to understand from the drawings, the player object 62 is displayed such that the player object 62 turns (shows) his back to the player on the game screen 60. This is because, as described later, the left hand of the player holding the case 12a is arranged in correspondence to the left hand of the player object 62 while the right hand of the player holding the case 12a is arranged in correspondence to the right hand of the player object 62, and whereby, operability of the game is improved.

Figure 5:
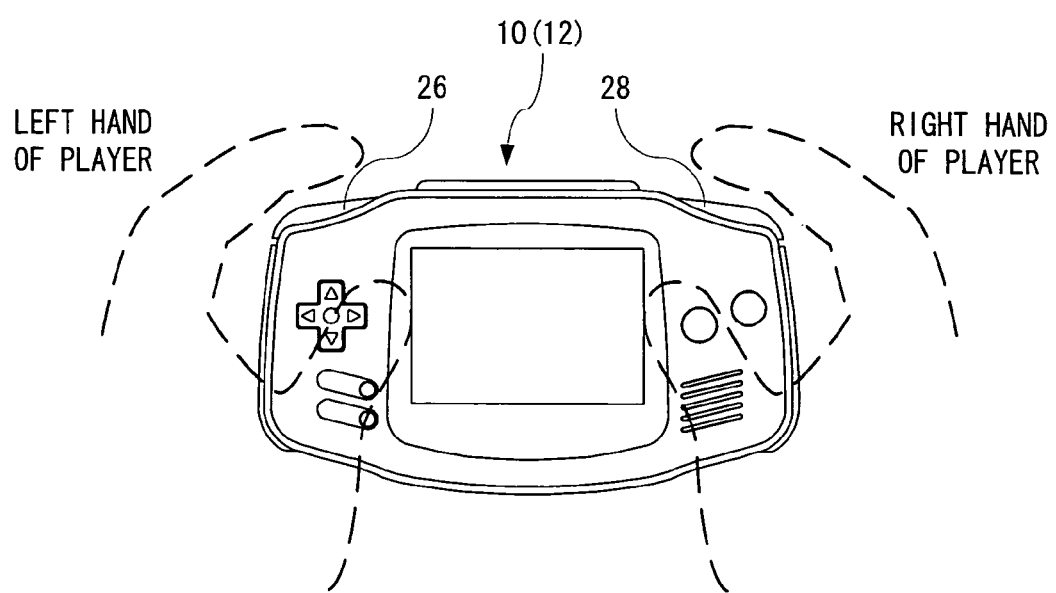
FIG. 5 is an illustrative view showing a state in which a player operates the game apparatus shown in FIG. 1.

More specifically, as shown in FIG. 5, the player holds the case 12a of the game apparatus 10 (game machine 12) in both hands. At this time, the left hand of the player holds the case 12a with the operation buttons 16, 18 and 20 (see FIG. 1) operable with his thumb, and the right hand of the player holds it with the operation buttons 22 and 24 (see FIG. 1) operable with his thumb. At this time, the operation button 26 is operable with the index finger of the left hand of the player, and the operation button 28 is operable with the index finger of the right hand of the player.

Thus, for example, by depressing (turning on) the operation button (L button) 26 provided on the game machine 12 (case 12a) with the index finger of his left hand, the player can input an instruction for a holding action of the left hand 62a of the player object 62, and by depressing (turning on) the operation button (R button) 28 with the index finger of his right hand, the player can input an instruction for a holding action of the right hand 62b of the player object 62.

That is, as shown in FIG. 4, the suspended state of the player object 62 means that the player turns the operation buttons 26 and 28 on with his index fingers of both hands. In the suspended state, when the player releases (turns off) the operation button 28, for example, the player object 62 releases the right hand 62b from the handle 64 as shown in FIG. 6 (A), and then, the player object 62 and the handle 64 are rotated to the left. At this time the player object 62 is rotated with the left hand 62a taken as the center, and the handle 64 held by the left hand 62a is also rotated. That is, in a case that the player object 62 is rotated, it can be said that the player object 62 is rotated with the handle 64 held by himself taken as the center.

During rotation, when the right hand 62b of the player object 62 passes over the handle 64, the player turns the operation button 28 on, then, the player object 62 holds the handle 64 in its right hand 62b. That is, when the player object 62 is instructed to perform a holding action by the player, in a case that the handle 64 exists at a place where the hand exists as instructed above, the handle 64 is held. Accordingly, as shown in FIG. 6 (B), the player object 62 holds the handle 64 with each of the left hand 62a and the right hand 62b, and becomes in a suspended state.

Furthermore, when the player turns the operation button 26 off in a suspended state as shown in FIG. 6 (B), the player object 62 releases its left hand 62a from the handle 64, and rotates to the right as shown in FIG. 7 (A). At this time, the player object 62 is rotated with the right hand 62b taken as the center, and the handle 64 held by the right hand 62b is also rotated.

During rotation, when the left hand 62a of the player object 62 passes over the handle 64, the player turns the operation button 26 on, then, the player object 62 holds the handle 64 with its left hand 62a. Accordingly, as shown in FIG. 7 (B), for example, the player object 62 holds the handle 64 with each of the left hand 62a and the right hand 62b, and becomes in a suspended state.

Here, as shown in FIG. 4, FIG. 6 (B) and FIG. 7 (B), when holding the handle 64 in both hands, the player object 62 becomes in the suspended state. It is noted that although illustration is omitted, in this embodiment, in a case the operation button (for example, A button 22) except for the operation buttons 26 and 28 is depressed during rotation also, that is, in a case of holding the handle 64 with one hand, the player object 62 stops rotating to enter in the suspended state.

Furthermore, by shifting the state (states of rotation and suspend) from the suspended state shown in FIG. 4 to FIG. 6 (A), FIG. 6 (B), FIG. 7 (A), and FIG. 7 (B) in this order according to the operation by the player, the player object 62 is moved from a position where the two handles 64 are arranged side by side at approximately the center of the game screen 60 to a position where the two handles 64 are arranged at upper left of the game screen 60. That is, by changing the handle 64 to be held through the rotation movement, the player object 62 is moved toward a position desired by the player.

Figure 8:
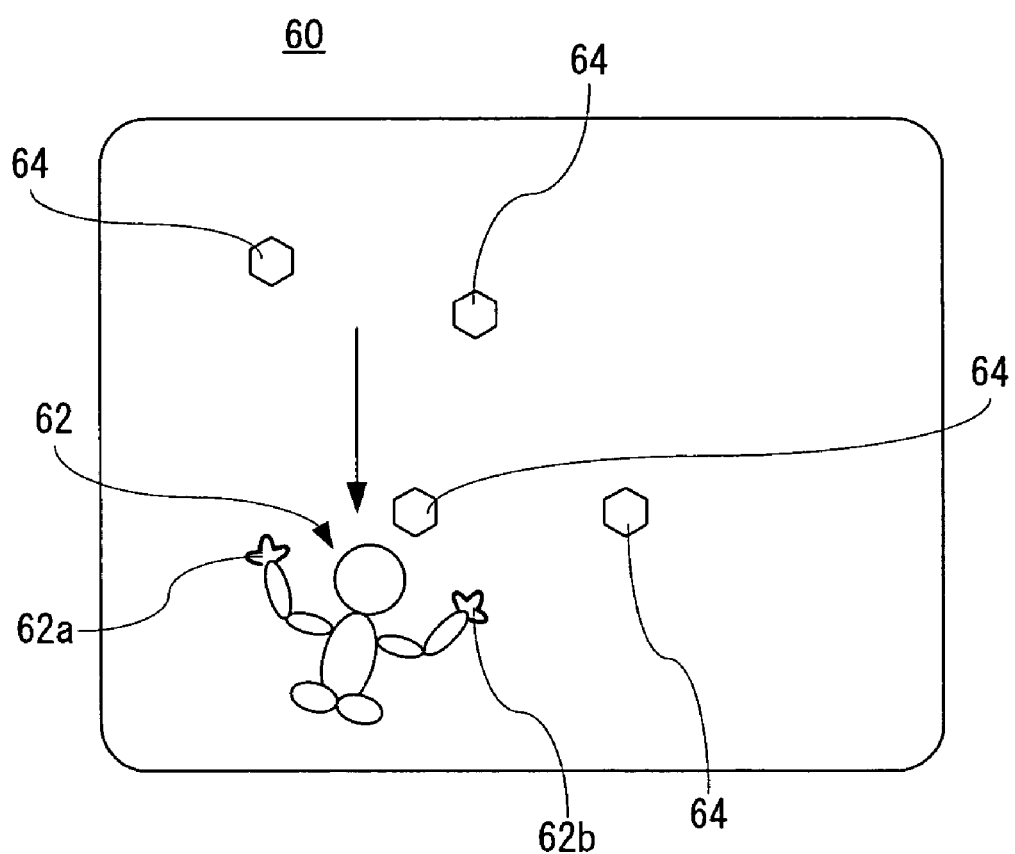
FIG. 8 is an illustrative view showing a further example of the game screen displayed on the LCD of the game machine shown in FIG. 1.

When the player turns the operation buttons 26 and 28 off in the suspended state as shown in FIG. 7 (B), the player object 62 releases each of the left hand 62*a* and the right hand 62*b* from the handle 64, that is, releases both hands, and thus, the player object 62 falls (free-falls) downwardly on the game screen 60 as shown in FIG. 8. Although illustration is omitted, when the player object 62 continuously falls, the game screen 60 is scrolled downwardly, and when it falls up to a predetermined position of the game space, the game is over (game over). However, during falling, in a case the handle 64 exists in a place where the left hand 62*a* or the right hand 62 of the player object 62 exists, if the player object 62 can hold the handle 64 in response to the operation by the operation button 26 or 28 by the player, the player object 62 stops falling.

Figure 9:
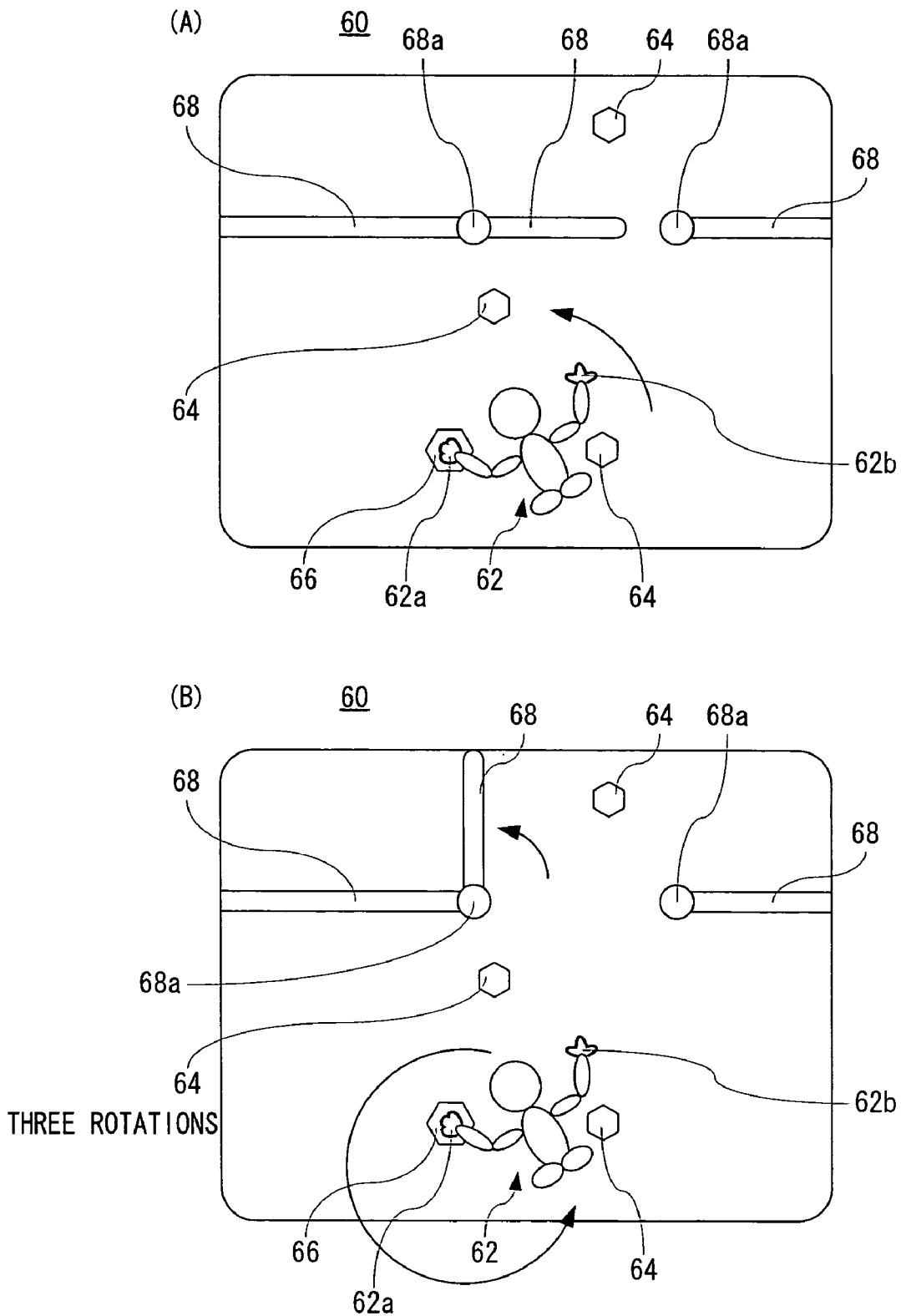
FIG. 9 is an illustrative view showing another example of the game screen displayed on the LCD of the game machine shown in FIG. 1.

FIG. 9 (A) is an illustrative view showing another example of the game screen 60. On the game screen 60, a special handle 66 and a blocking bar 68 as well as the handle 64 are arranged. For example, the special handle 66 is the same as the handle 64 in shape, and is rendered larger than the handle 64. In this embodiment, for the sake of simplicity, the handle 64 and the special handle 66 are discriminated from each other in only size. It is noted that they may be discriminated by changing a shape or a color (or pattern) as well as the size, or arbitrarily combining them for the change. Alternatively, when the player object 62 holds the special handle 66, a specific sound effect may be rung.

The blocking bars 68 are coupled with a connection 68*a*, and arranged so as to hinder the player object 62 from progressing in an upper direction. It is noted that a part of the blocking bars 68 is opened/closed around the connection 68*a* as a supporting point, and opened by rotation of the special handle 66 (player object 62). For example, when the player object 62 rotates with the special handle 66 in his hand, and the number of rotations reaches a predetermined number of times, the blocking bar 68 is opened.

More specifically, on the game screen 60 shown in FIG. 9 (A), the player object 62 rotates to the left with the special handle 66 in the left hand 62*a*. Here, when the number of rotations reaches the predetermined number of times (for example, three times), that is, when the special handle 66 is rotated three times, the blocking bar 68 is opened as shown in FIG. 9 (B). Thus, the player object 62 can proceed upwardly on the game screen 60.

It is noted that, in this embodiment, although the blocking bar 68 is opened by rotation of the special handle 66, the blocking bar 68 that was once opened may be closed. For example, it is appropriate that after the blocking bar 68 is once opened, the special handle 66 is rotated a predetermined number of times, and then, the blocking bar 68 may be closed.

Alternatively, when the special handle 66 is rotated to the left (or to the right) a predetermined number of times, the blocking bar 68 is opened, and after the special handle 66 is once opened, when the special handle 66 is rotated to the right (or to the left) a predetermined number of times, the blocking bar 68 may be closed. In this case, until the special handle 66 is rotated the predetermined number of times, the blocking bar 68 is kept open or closed. It is noted that every time that the special handle 66 (player object 62) rotates one time, the blocking bar 68 may be gradually opened or closed.

Figure 10:
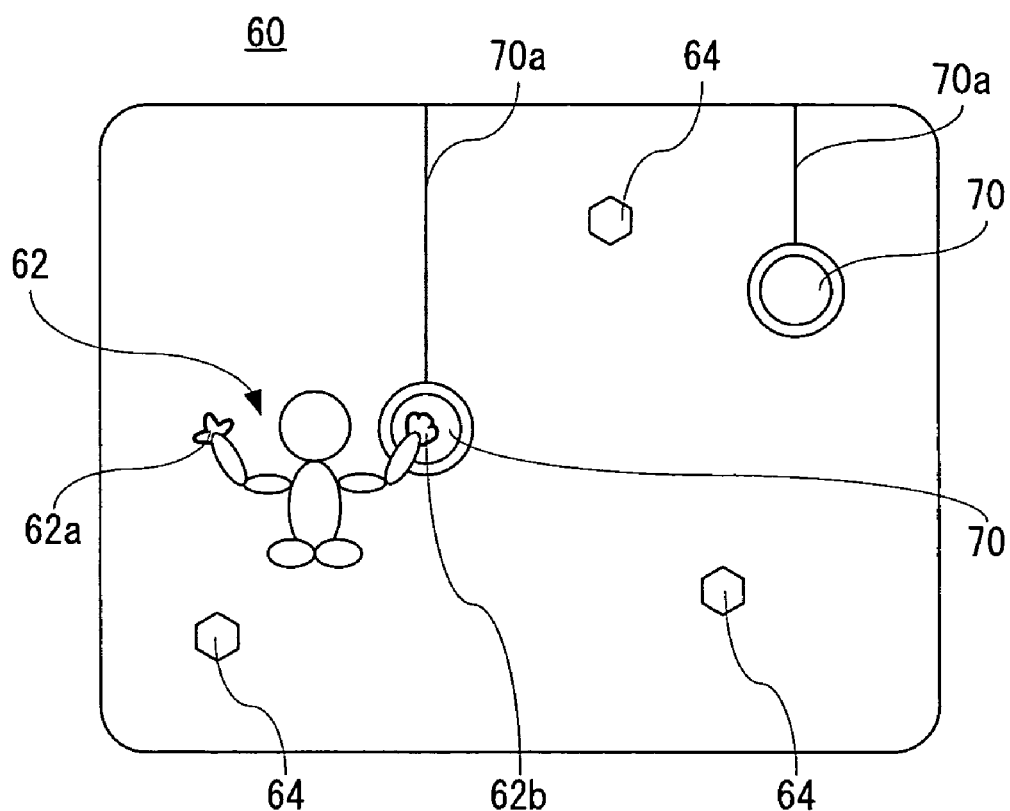
FIG. 10 is an illustrative view showing another example of the game screen displayed on the LCD of the game machine shown in FIG. 1.

FIG. 10 shows an illustrative view of another example of the game screen 60. On the game screen 60 shown in FIG. 10, the handle 64, and a special handle 70 other than the special handle 66 are displayed. The special handle 70 is different from the special handle 68 shown in FIG. 9 (A) and FIG. 9 (B) in shape, etc. More specifically, the special handle 70 is in the form of circle, and arranged such that it is suspended from overhead with a cord 70*a*. In an example shown in FIG. 10, the player object 62 suspends with the special handle 70 in its right hand 62*b*. When the player object 62 (special handle 70) rotates to the right from the suspended state, and the number of rotations reaches the predetermined number of times (in this embodiment twice), the special handle 70 is moved by a predetermined distance upwardly on the game screen 60 as shown in FIG. 11 (A). Accordingly, the player object 62 that holds the special handle 70 is moved by the predetermined distance upwardly on the game screen 60 together with the special handle 70.

Conversely, when the player object 62 rotates to the left with the special handle 70 in its left hand 62*a*, and the number of rotations reaches the predetermined number of times (in this embodiment twice), the player object 62 that holds the special handle 70 is moved by the predetermined distance downwardly on the game screen 60 together with the special handle 70 as shown in FIG. 11 (B). Accordingly, the player object 62 that holds the special handle 70 is moved by the predetermined distance downwardly on the game screen 60 together with the special handle 70.

It is noted that although not represented in the drawing, due to the rotating movement of the player object 62 and the special handle 70, when the special handle 70 is moved by the predetermined distance upwardly, a representation is made such that a cord 70*a* is wrapped around the special handle 70, and when the special handle 70 is moved by the predetermined distance downwardly, a representation is made such that the cord 70*a* that wrapped around the special handle 70 is withdrawn. That is, the special handle 70 is a moving image object like a yoyo movement.

Furthermore, in this embodiment, the player object 62 is rotated the predetermined number of times and then, moved by the predetermined distance upwardly or downwardly. However, it may be possible that the player object 62 is gradually moved upwardly or downwardly every rotation.

Furthermore, the predetermined distance is a distance in the game space, and set by programmers or developers et al. in advance.

Figure 12:
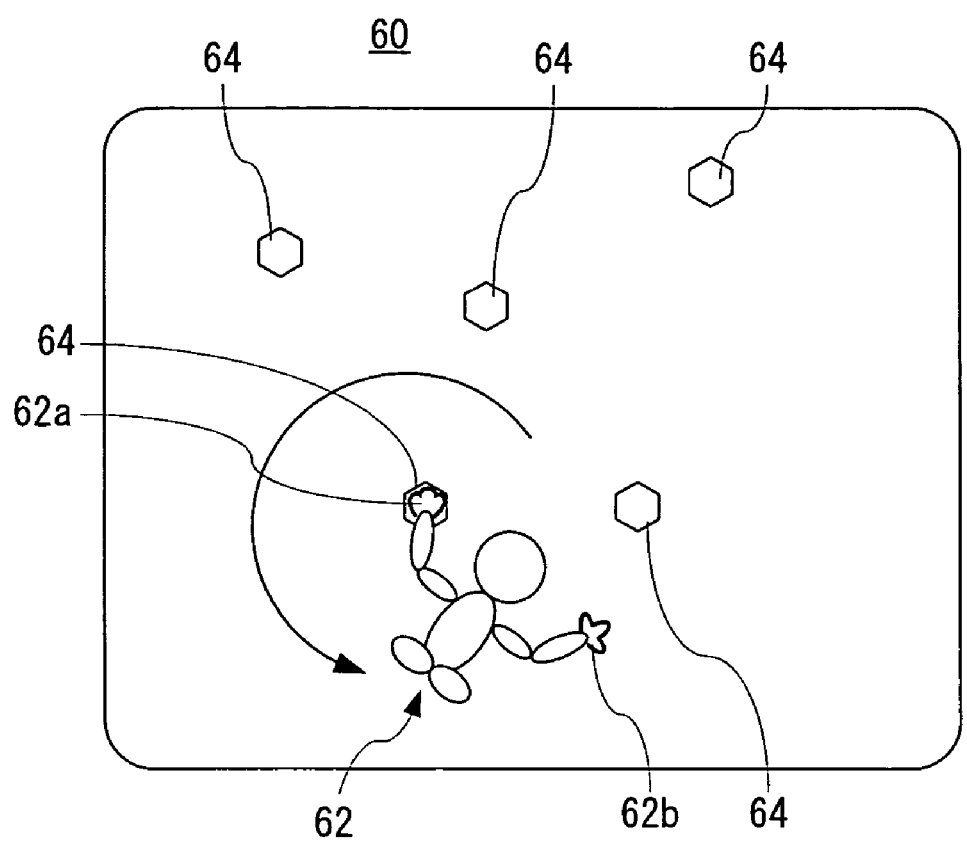
FIG. 12 is an illustrative view showing another example of the game screen displayed on the LCD of the game machine shown in FIG. 1.

In addition, it is also possible that the player object 62 moves in an arbitrary direction by jumping. FIG. 12 shows a game screen 60 in which the player object 62 rotates to the left with the handle 64 in its left hand 62*a*. Thus, the player releases the operation button 26 in a state that the player object 62 rotates, the player object 62 jumps out to a direction of a tangent that is brought into contact with a circle (or an arc of a circle) formed by a path of the rotation. It is noted that the circle (or the arc of the circle) formed when the player object 62 rotates is a path with the head of the player object 62 taken as the center in this embodiment.

After jumping, when the player operates the operation button 26 or 28, or the both thereof at a desired timing, in a case that the handle (64, 66, 70) exists at a place where the hand of the player object 62 (the left hand 62*a*, the right hand 62*b* or the both hands) exists, the player object 62 can hold the handle (64, 66, 70). For example, FIG. 13 (A) shows a game screen 60 in which the player object 62 jumps out in a state shown in FIG. 12, and then holds the handle 64 in its left hand 62*a*.

After jumping, when the player operates the operation button 26 or 28, or both at a desired timing, in a case that the handle (64, 66, 70) does not exist at a place where the hand of the player object 62 (the left hand 62a, the right hand 62b or the both hands) exists, or in a case that the player does not operate the operation buttons 26 and 28, the player object 62 moves so as to describe a path of parabola as shown in FIG. 13 (B). That is, after the player object 62 jumps out in the right obliquely upward direction, when a upward velocity becomes 0, the player object 62 falls (free-falls) in the right oblique downward direction.

Figure 14:
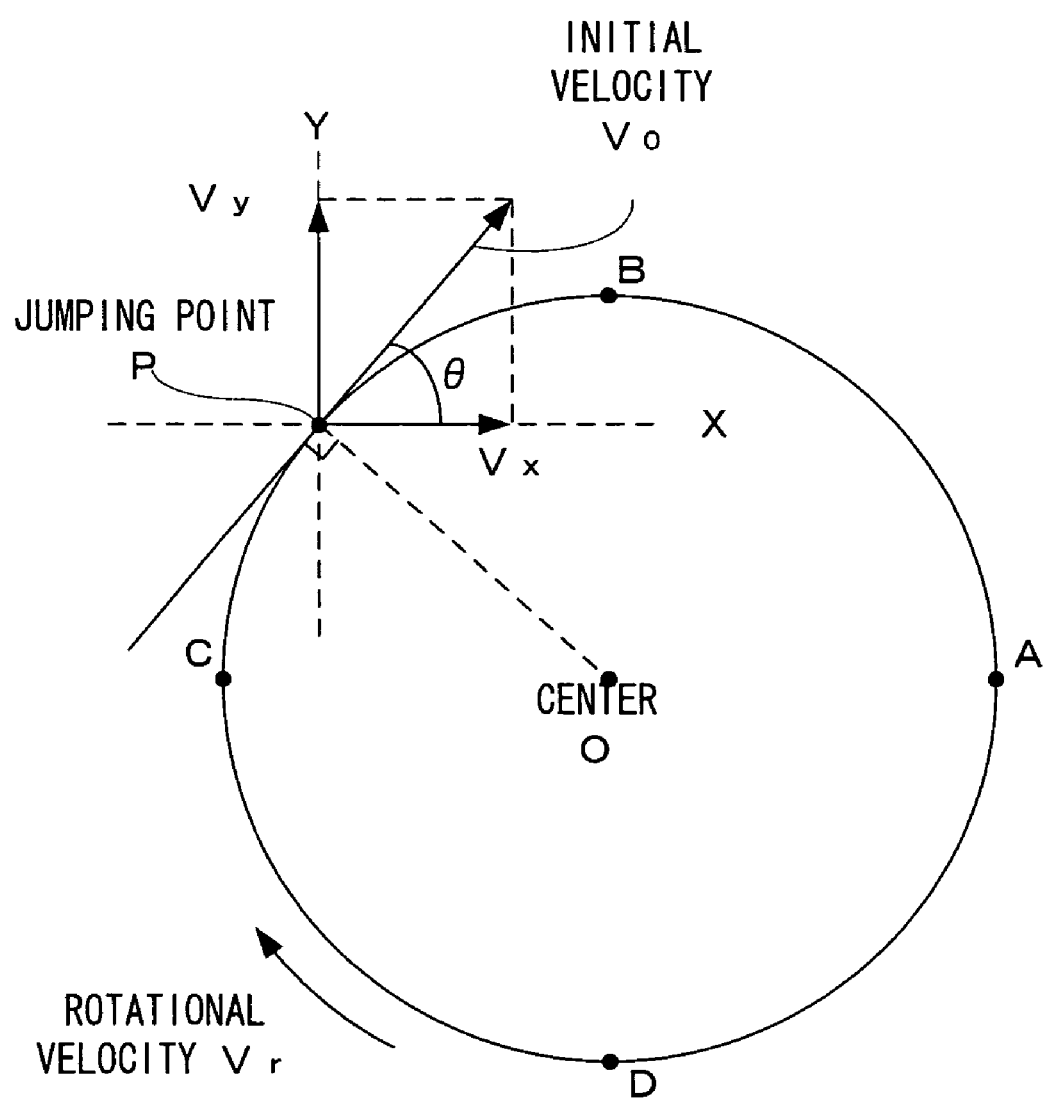
FIG. 14 is an illustrative view describing a jumping action of a player object shown in FIG. 13.

By use of FIG. 14, the jump of the player object 62 is described in detail. Here, assuming that the player object 62 rotates to the right direction at a rotational velocity Vr, and jumps out at a point P. In addition, the center O of the circle is a center of the right hand 62b of the player object 62, that is, a center of the handle (64, 66, 70) held by the right hand 62b.

In a case that the player object 62 jumps out at the point P, the player object 62 jumps out to the diagonal direction at an initial velocity Vo at that time, and moves so as to describe a parabola in accordance with a diagonally projecting movement. In general, the initial velocity Vo is equal to the rotational velocity Vr, but corrected in correspondence to the progress of the game. For example, when a predetermined condition such as obtaining a predetermined item, rotating the predetermined number of times or more, and so forth is satisfied, the initial velocity Vo is decreased or increased in speed. Alternatively, the initial velocity Vo is changeable depending on the kind or a parameter (life, level, or the like) of the player object 62, or the kind of the handle to be held.

More specifically, the initial velocity Vo, its X component Vx, and its Y component Vy are obtained according to an equation 1. It is noted that $\alpha$ is a correction value changeable in correspondence to the progress of the game described above. Furthermore, $\theta$ is an angle (acute angle) formed by a vector (velocity vector) as to the initial velocity Vo and a line parallel to an X axis passing through the point P, and detected at a time of jumping. Furthermore, the right direction of the drawing is a normal direction of the X direction, and the upper direction of the drawing is a normal direction of the Y direction.

$V_0 = Vr \times \alpha$ $Vx = V_0 \cos\theta$ $Vy = V_0 \sin\theta$ [Equation 1]

Furthermore, in a diagonally projecting movement, the X component Vx of the initial velocity Vo is constant irrespective of a lapse of time, but to the Y component Vy thereof, the gravitational acceleration g is applied in a vertically downward direction, and thus, the X component Vx and the Y component Vy of the velocity after t seconds is calculated according to an equation 2. It is noted that after the player object 62 reaches a maximum point in the Y direction, that is, when the velocity in the upper direction (Y component Vy) becomes 0, the free falling movement occurs. In addition, as to the Y direction, since the upper direction is the normal direction, in a case that the player object 62 rotates to the right, Y component (Vy) of the velocity becomes a minus sign during passing through from a point B to the point D via the point A shown in FIG. 14.

$Vx = V_0 \cos\theta$ $Vy = V_0 \sin\theta - gt$ [Equation 2]

Therefore, the distance in the X direction and the distance in the Y direction of the movement of the player object 62 (strictly, the center of the head thereof) after a time of t seconds with the point P taken as a reference are calculated according to an equation 3.

$x = V_0 \cos\theta \cdot t$ $y = V_0 \sin\theta \cdot t - \frac{1}{2}(gt^2)$ [Equation 3]

By use of the result of the calculation, the position coordinates after the player object 62 moves are calculated by an equation 4. It is noted that absolute values of the calculated distances x and y are utilized. The position coordinates (coordinates at the point P) of the player object 62 before movement, that is, on jumping are (X1, Y1), and the position coordinates of the player object 62 after movement are (X2, Y2).

$x = \sqrt{(X2-X1)^2}$ $y = \sqrt{(Y2-Y1)^2}$ [Equation 4]

Thus, when the position coordinates after movement is calculated, the movement of the player object 62 is controlled such that the player object 62 (of the head) is arranged at the position indicated by the position coordinates. At this time, the player object 62 is moved at a speed calculated according to the equation 2 at a position after movement, that is, at a speed having a direction and a magnitude determined by a composite vector composing the velocity vector of the X component (Vx) and the velocity vector of the Y component (Vy) of the speed.

It is noted that with respect to the points A to D shown in FIG. 14, the point A and the point C are in the line passing through the center O that is parallel to the X axis, and therefore, the player object 62 moves according to a vertically-projected movement, and the positions B and D are in the line passing through the center O that is parallel to the Y axis, and therefore, the player object 62 moves according to a horizontally-projected movement. In this embodiment, regarding the vertically-projected movement and the horizontally-projected movement as a modified embodiment of the diagonally-projecting movement, the same calculation is performed by use of the equation 3, and the description thereof is briefly made here.

When the player object 62 rotates to the right, in a case of jumping over at the position A or the position C, it moves according to the vertically-projected movement as described above. Therefore, the movement of the player object 62 in the X direction is ignored, and the movement of the player object 62 in the Y direction is only calculated. In such a case, the calculation is made according to the equation 4. At this time, the Y component Vy at the initial velocity Vo is equal to the Vo. It is noted that in a case of jumping at the point A, the movement of the player object 62 is in a downward direction, and therefore, the initial velocity Vo of the Y component Vy becomes a minus sign.

$y = V_0 \cdot t - \frac{1}{2}(gt^2)$ [Equation 5]

When the player object 62 rotates to the right, in a case of jumping over at the position B or the position D, it moves according to the horizontally-projected movement as described above. In such the case, the movement of the player object 62 in the X direction is made according to a constant-velocity movement, and the movement of the player object 62 in the Y direction is made according to the free-fall movement, and therefore, the X component Vx at the initial velocity Vo is equal to the Vo, and the Y component Vy at the initial velocity Vo is equal to 0. Thus, the calculation is made according to an equation 6. It is noted that in a case that the player object 62 jumps over at the position D, the movement direction of the player object 62 is to the left, and therefore, the initial velocity Vo of the Y component Vy becomes a minus sign.

$$x = V_0 \cdot t$$
$$y = -\tfrac{1}{2}(gt^2) \quad \text{[Equation 6]}$$

Thus, the position after movement (jumping) is calculated every time that the game screen 60 is updated (for example, for each frame), and the position of the player object 62 is updated.

As described above, the movement of the player object 62 in a case of jumping while rotating to the right is controlled. However, a case where the player object jumps while rotating to the left may be considered point-symmetrically with the center O of the circle taken as the center of the symmetry to a case where the player object jumps while rotating to the right.

Furthermore, in the game machine 12 of this embodiment, in a case of rotating the player object 62, the position coordinates to be moved to the right or the left at the rotational velocity Vr having a constant distance between the center O and the player object 62 (the center of the head) is calculated, and therefore, it is not clear which direction the player object 62 jumps. However, it is necessary that the signs (+,−) with respect to the X component Vx and the Y component Vy at the initial velocity Vo are changed depending on the direction of jumping. That is, it is necessary to change the signs of the X component Vx and the Y component Vy at the initial velocity Vo. As described in FIG. 14, the direction of jumping is determined depending on the rotation direction before jumping and the jumping point. Thus, on rotation, a flag (counterclockwise rotation flag, clockwise rotation flag) indicative of in which direction the player object 62 rotates is established (turned on). Furthermore, which direction the player object 62 rotates depends on with which hand the handle (64, 66, 70) is held, and therefore, a flag (left hand flag, right hand flag) indicative of determining with which hand the handle (64, 66, 70) is held is also turned on.

Furthermore, in this embodiment, in each of the handles (64, 66, 70), the position coordinates (for convenience in writing, referred to as "central coordinates") for arranging the handles (64, 66, 70) are stored. When the rotation direction is detected by the counterclockwise rotation flag or the clockwise rotation flag, the symbols (+,−) with respect to the X component Vx and the Y component Vy at the initial velocity Vo is determined on the basis of the jumping point as to the central coordinates. For example, in a case that the position P is the jumping point, the x coordinate of the position P is smaller in value than the x coordinate of the center O, the y coordinate of the position P is greater in value than the y coordinate of the center O, and whereby, it is shown that the player object 62 jumps at an interval between the point B and the point C (quarter of the length of circumference). Accordingly, in a case of rotating to the right, the player object 62 jumps out in the right obliquely upper direction, and moves according to the diagonally projecting movement, and in a case of rotating to the left, the player object 62 jumps out in the left obliquely lower direction, and moves according to the diagonally projecting movement.

More specifically, by use of FIG. 14 example, the signs with respect to the X component Vx and the Y component Vy at the initial velocity Vo are determined in accordance with a table 1. It is noted that in the table 1, "AB" indicates that the player object 62 jumps out between the point A and the point B, and is equal to a quarter of the length of the circumference. It is noted that in a case that the player object 62 jumps out at each of the points A, B, C, and D, it moves according to the horizontally-projected movement or the vertically-projected movement described above, and therefore, any one of the X component and the Y component becomes 0. This is shown in a table 2. It is noted that the velocity component of 0 is indicated by blanks.

TABLE 1

|    | ROTATION TO THE LEFT | | ROTATION TO THE RIGHT | |
|----|---|---|---|---|
|    | X COMPONENT | Y COMPONENT | X COMPONENT | Y COMPONENT |
| AB | −  | + | + | − |
| BC | −  | − | + | + |
| CD | +  | − | − | + |
| DA | +  | + | − | − |

TABLE 2

|   | ROTATION TO THE LEFT | | ROTATION TO THE RIGHT | |
|---|---|---|---|---|
|   | X COMPONENT | Y COMPONENT | X COMPONENT | Y COMPONENT |
| A |   | + |   | − |
| B | − |   | + |   |
| C |   | − |   | + |
| D | + |   | − |   |

It is noted that the points A, B, C, and D may be stored in advance in correspondence with the central coordinates of the handle, or may be obtained by an arithmetic operation when the player object 62 holds the handle.

Figure 15:
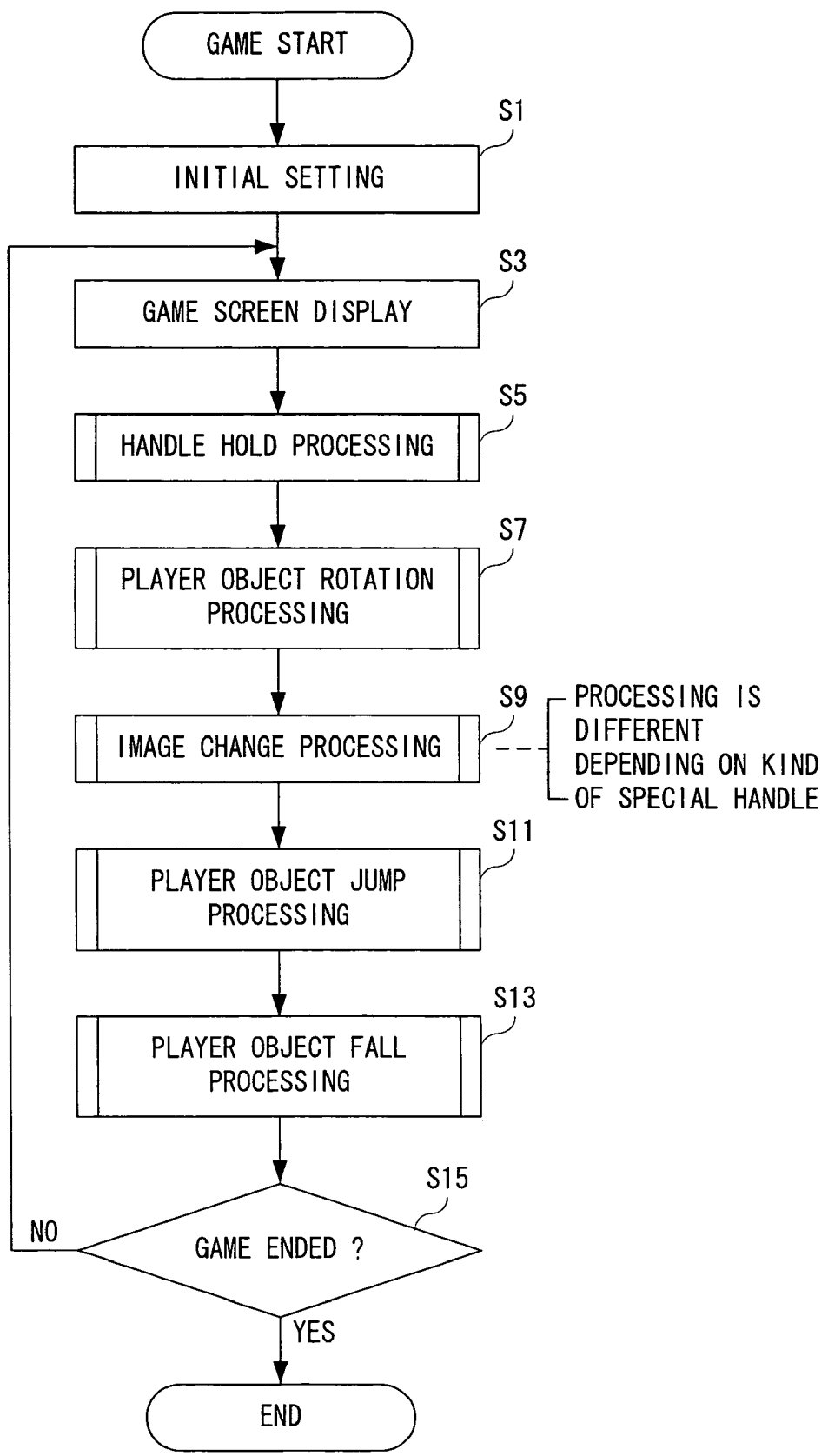
FIG. 15 is a flowchart showing a game process of a CPU shown in FIG. 2.

The above-described operation is processed by the CPU 40 shown in FIG. 2 according to the game program. More specifically, the CPU 40 processes a flowchart shown in FIG. 15-FIG. 21. As shown in FIG. 15, when the game is started, an initial setting is first performed in a step S1. For example, in a case that the game is started from the top, a flag and game data are cleared, and image data such as an image of the first field (first screen), an image of the handle object arranged in the field, an image of the player object, etc. are read from the ROM 52. Alternatively, if the game is started from the place where the player previously quits, the stored game data is read from the RAM 54. The flag with respect to the necessary data is set, and image data such as the following field image, the handle object image arranged in the field, the player object image, etc. are read from the ROM 52. It is noted that the read image data is developed in the VRAM.

In a succeeding step S3, the game screen 60 is displayed on the LCD 14, and in a step S5, a handle hold processing (see FIG. 16) described later is executed. Next, in a step S7, a player object rotation processing (see FIG. 17) described later is executed, and in a step S9, an image change processing (see FIG. 18, see FIG. 19) described later is executed. The image change processing is different depending on the kind of the special handle (special handles 66, 70 in this embodiment). It is noted that in a case that the player object 62 does not hold the special handle 66 or 70, the process in the step S9 is not executed, and directly proceeds to a next step S11. In the next step S11, a player object jump processing (see FIG. 20) described later is executed, and in a step S13, a player object fall processing (see FIG. 21) described later is executed.

Then, in a step S15, it is determined whether a game has ended or not. If "NO" in the step S15, that is, if it is not the game end, the process returns to the step S3 so as to update the game screen 60 according to the operation by the player, the processes in the steps S5, S7, S9, S11, S13, etc., and displays the updated game screen 60. That is, the processes in the steps S3-S15 are executed every frame. On the other hand, if "YES" in the step S15, that is, if it is the end of the game, or if the end of the game is instructed by a player's operation, the game processing is ended.

Figure 16:
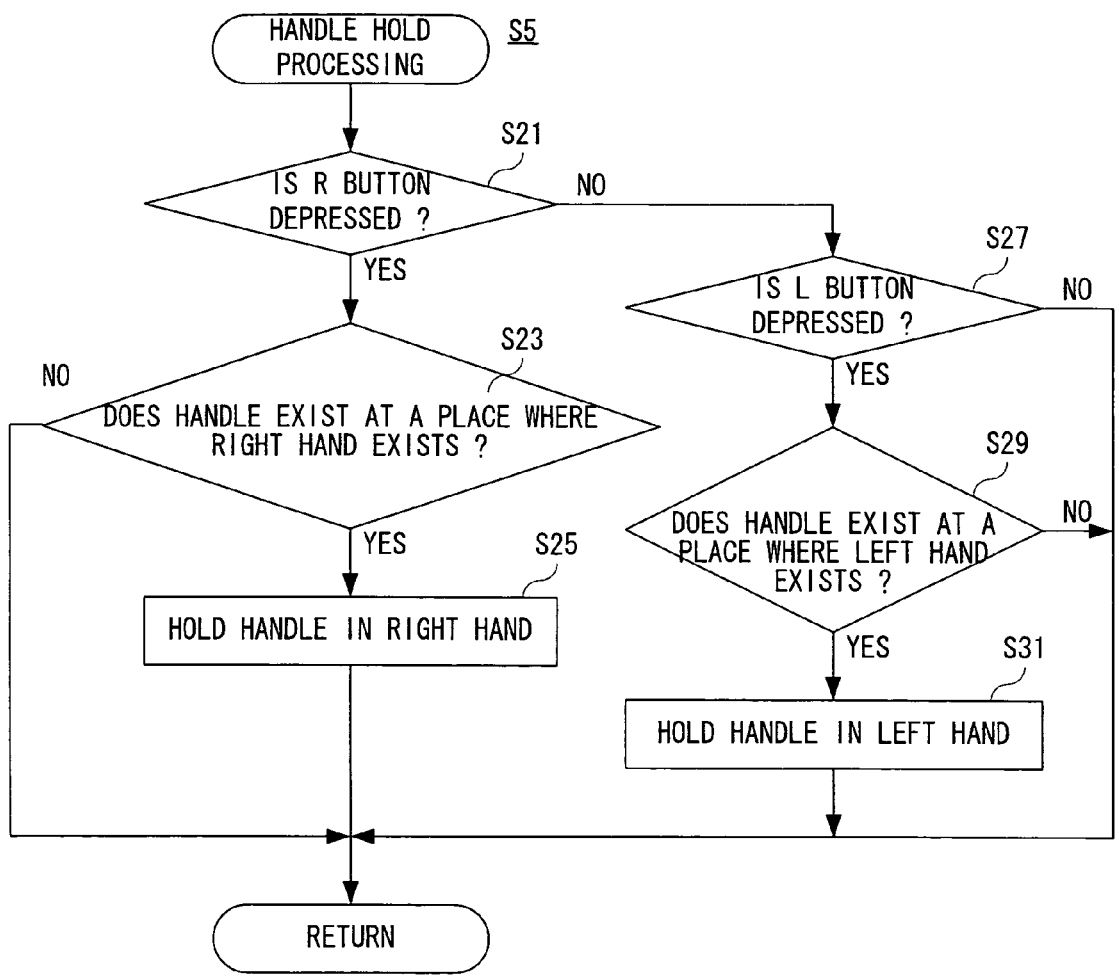
FIG. 16 is a flowchart showing a handle hold processing of the CPU shown in FIG. 2.

As shown in FIG. 16, when the handle hold processing is started, it is determined whether or not the R button 28 is depressed (turned on) in a step S21. If "YES" in the step S21, that is, if the R button 28 is turned on, it is determined whether or not the handle (handle 64, special handle 66 or special handle 70) exists at a place where the right hand 62b exists in a step S23 (first determination). Hereinafter, in a case of being simply called the "handle", its expression shall include any one of the handle 64, the special handle 66, and the special handle 70.

If "NO" in the step S23, that is, if the handle does not exist at a place where the right hand 62b exists, the handle hold processing is directly returned. On the other hand, if "YES" in the step S23, that is, if the handle exists at a place where the right hand 62b exists, the handle is held by the right hand 62b (right hand operation processing) in a step S25, and the handle hold processing is returned. For example, in the step S25, the flag (right hand flag) indicative of holding the handle in the right hand 62b is turned on, and the right hand 62b of the player object 62 is grasped such that the handle is held by the right hand 62b.

Furthermore, if "NO" in the step S21, that is, if the R button 28 is not turned on, it is determined whether or not the L button 26 is depressed (turned on) in a step S27. Here, if the L button 26 is not turned on, "NO" is determined, and the handle hold processing is directly returned. However, if the L button 26 is turned on, "YES" is determined, and then, it is determined that the handle exists at a place where the left hand 62a exists in a step S29 (second determination).

If "NO" in the step S29, that is, if the handle does not exist at a place where the left hand 62a exists, the handle hold processing is directly returned. On the other hand, if "YES" in the step S29, that is, if the handle exists at a place where the left hand 62a exists, the handle is held by the left hand 62a (left hand operation processing) in a step S31, and the handle hold processing is returned. For example, in the step S31, the flag (left hand flag) indicative of holding the handle in the left hand 62a is turned on, and the left hand 62a of the player object 62 is grasped such that the handle is held by the left hand 62a.

It is noted that although illustration is omitted, when the L button 26 and the R button 28 are released (turned off) as described above, the left hand flag and the right hand flag are turned off in response thereto, and a processing of releasing the left hand and the right hand from the handle is processed.

Figure 17:
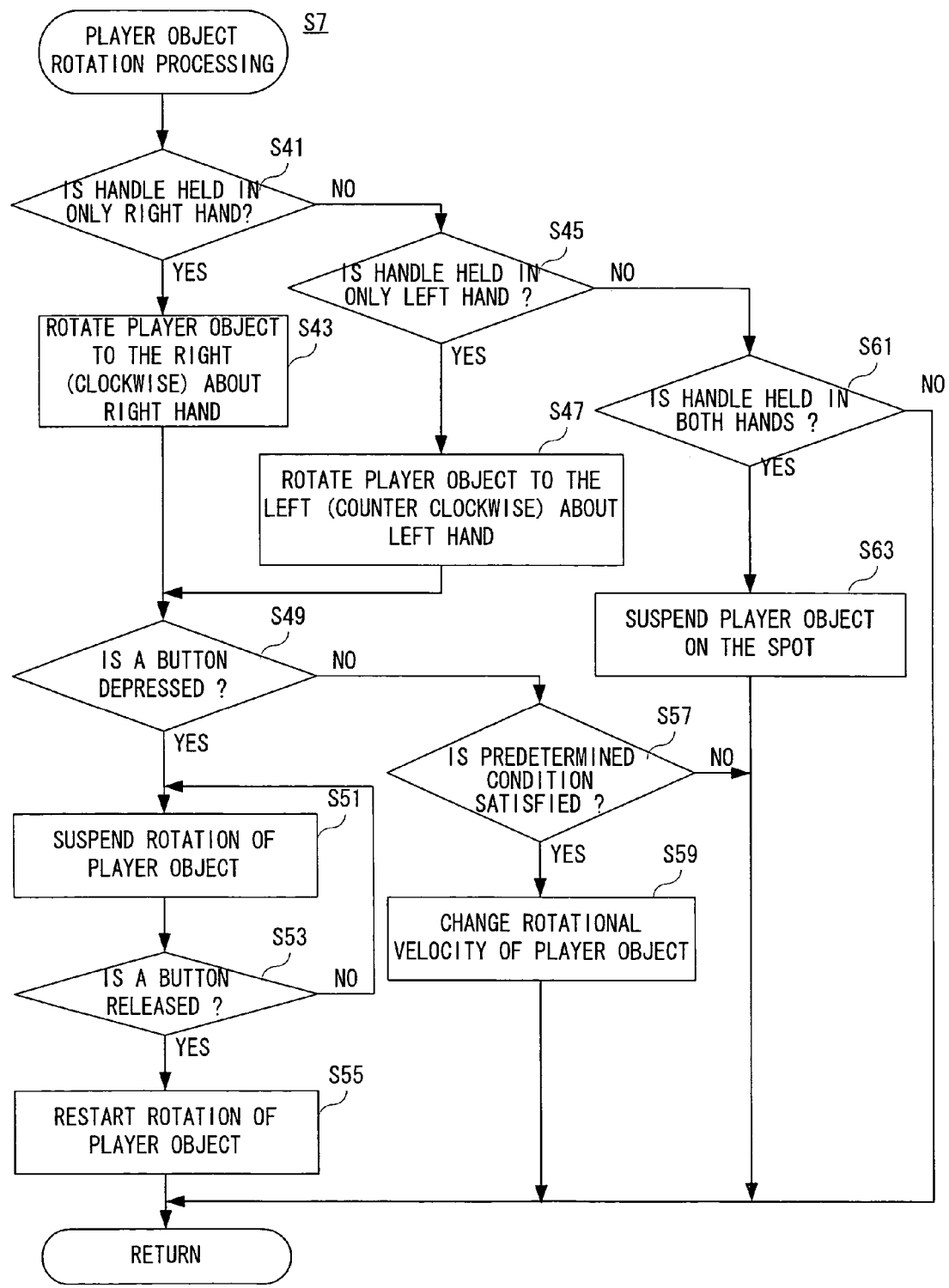
FIG. 17 is a flowchart showing a player object rotation processing of the CPU shown in FIG. 2.

As shown in FIG. 17, when the player object rotation processing is started in the step S7 shown in FIG. 15, it is determined whether or not the handle is held by only the right hand 62b in a step S41. More specifically, it is determined whether the right hand flag is turned on, and the left hand flag is turned off or not. Here, in a case that only the left hand flag is turned on, in a case that both of the right hand flag and the left hand flag are turned on, or in a case that both of the right hand flag and the left hand flag are turned off, "NO" is determined, and the process proceeds to a step S45.

In a case that only the right hand flag is turned on, "YES" is determined, and the player object 62 is rotated to the right (clockwise) with the right hand 62b taken as the center in a step S43, then, the process proceeds to a step S49. At this time, the handle held by the right hand 62b is also rotated to the right. Also, at this time, the flag (clockwise rotation flag) indicative of rotating to the right is turned on. The clockwise rotation flag is turned off when the counterclockwise rotation flag, an under-suspension flag, and a jumping flag described later are turned on.

Furthermore, in the step S45, it is determined whether or not the handle is held by only the left hand 62a. More specifically, it is determined whether the left hand flag is turned on, and the right hand flag is turned off or not. Here, in a case that both of the right hand flag and the left hand flag are turned on, or both of the right hand flag and the left hand flag are turned off, "NO" is determined, and the process proceeds to a step S61.

On the other hand, in a case that only the left hand flag is turned on, "YES" is determined, and the player object 62 is rotated to the left (counterclockwise) with the left hand 62a taken as the center in a step S47, then the process proceeds to the step S49. At this time, the handle held by the left hand 62a is also rotated to the left. Furthermore, at this time, the flag (counterclockwise rotation flag) indicative of rotating to the left is turned on. The counterclockwise rotation flag is turned off when the above-described clockwise rotation flag and the under-suspension flag and jumping flag to be described later are turned on.

In the step S49, it is determined whether or not the A button 22 is depressed (turned on). If "YES" in the step S49, that is, if the A button 22 is turned on, the rotation of the player object 62 is suspended in a step S51. At this time, the rotation of the handle held by player object 62 is also suspended. Also, the under-suspension flag is turned on. The under-suspension flag is turned off when the player object 62 starts to rotate, that is, when the clockwise rotation flag or the counterclockwise rotation flag is turned on.

Then, in a next step S53, it is determined whether or not the A button 22 is released (turned off). If "NO" in the step S53, that is, if the A button 22 is not turned off, the process directly returns to the step S51. However, if "YES" in the step S53, that is, if the A button 22 is turned off, the rotation of the player object 62 is restarted in a step S55, and the player object rotation processing is returned.

Furthermore, if "NO" in the step S49, that is, if the A button 22 is not turned on, it is determined whether or not a predetermined condition is satisfied in a step S57. Here, the predetermined condition is, as described above, satisfied when the player object 62 obtains a specific item, rotates a predetermined number of times or more, and so forth. Alternatively, the condition may be satisfied when the predetermined operation button (for example, B button 24) is depressed. The predetermined condition is set by programmers or developers et al., and needs not to be restricted thereto.

If "NO" in the step S57, that is, if the predetermined condition is not satisfied, the player object rotation processing is directly returned. On the other hand, if "YES" in the step S57, that is, if the predetermined condition is satisfied, the rotational velocity of the player object 62 is changed in a step S59, and the player object rotation processing is returned. For example, in the step S59, the rotational velocity is increased in speed by the obtainment of the specific item or the predetermined number or more of rotations, or the rotational velocity is decreased in speed by the obtainment of the specific item. Alternatively, every time that the operation button 24 is operated, the rotational velocity is increased or decreased in speed. Thus, the range of movement in jumping is changed.

Furthermore, in the step S61, it is determined whether or not the handle is held by both hands. That is, it is determined whether or not both the left hand flag and the right hand flag are turned on. Here, if any one of the left hand flag and the right hand flag or both of the flags are turned off, it is determined the handle is not held by both hands, that is, "NO" is determined, and the player object rotation processing is directly returned. However, if both the left hand flag and the right hand flag are turned on, it is determined that the handle is held by both hands, that is, "YES" is determined, and the player object 62 is suspended in that spot (state) in a step S63, returning to the player object rotation processing. It is noted that in step S63, the under-suspension flag is also turned on.

Next, a description is made on the image change processing shown in the step S9 in FIG. 15. However, as described above, the change of the image is different depending on the kind of the special handle, and therefore, the image change processing (1), (2) for each special handle is described. It is noted that the CPU 40 determines the kind of special handle to be held, and determines which process is to be executed.

Figure 18:
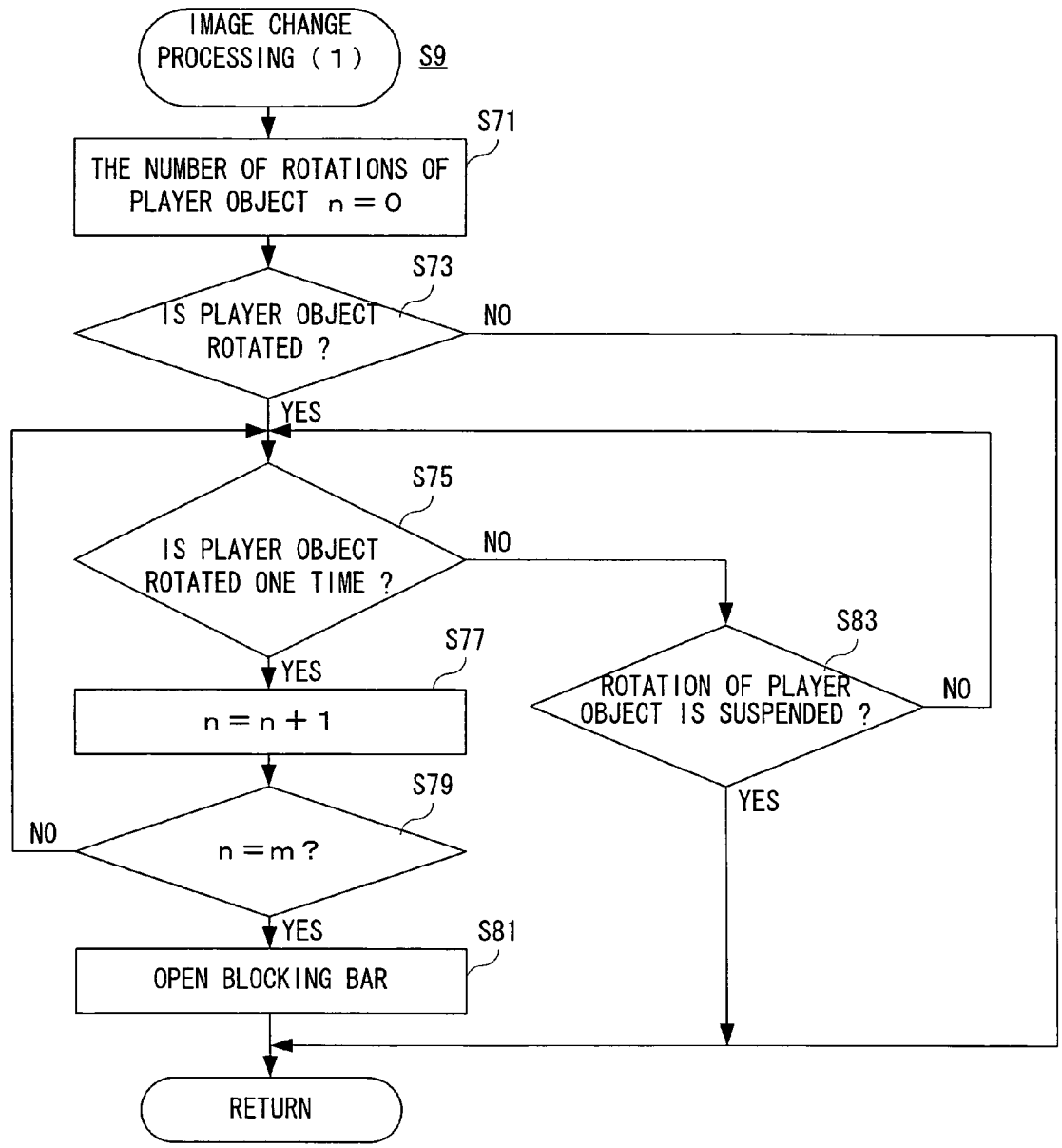
FIG. 18 is a flowchart showing an image change processing (1) of the CPU shown in FIG. 2.

In a case that the player object 62 holds the special handle 66, the image change processing (1) shown in FIG. 18 is selected, and the number of rotations n of the player object 62 is set to the default value in a step S71. That is, 0 is substituted into the variable n (n=0). In a next step S73, it is determined whether or not the player object 62 (or special handle 66) is rotated. That is, it is determined whether or not any one of the counterclockwise rotation flag or the clockwise rotation flag is turned on. If "NO" in the step S73, that is, if both the counterclockwise rotation flag and the clockwise rotation flag are turned off, it is determined that the player object 62 does not rotate, and the image change processing (1) is directly returned.

On the other hand, if "YES" in the step S73, that is, if any one of the counterclockwise rotation flag and the clockwise rotation flag is turned on, it is determined that the player object 62 rotates, and it is determined whether or not the player object 62 rotates one time (the number of rotations detection processing) in a step S75. For example, the position (coordinates) of the head (the center thereof) of the player object 62 at a time that the player object 62 holds the special handle 66 is stored, and when the player object 62 passes over the position by rotating, it is determined the player object 62 is rotated one time.

If "YES" in the step S75, that is, if the player object 62 rotates one time, the variable n is incremented (n=n+1) in a step S77. In a next step S79, it is determined if the variable n is equal to the predetermined number of times m (m=three in this embodiment). That is, it is determined whether or not the player object 62 rotates the predetermined number of times.

Here, if the variable n is not equal to the predetermined number of times m, the player object has not rotated the predetermined number of times. Thus, "NO" is determined in the step S79, and then, the process returns to the step S75. On the other hand, if the variable n is equal to the predetermined number of times m, the player object has rotated the predetermined number of times. Thus, "YES" is determined in the step S79, and then the blocking bar 68 corresponding to the special handle 66 is opened in a step S81, returning to the image change processing (1).

If "NO" in the step S75, that is, if the player object 62 does not rotate one time, it is determined whether or not the rotation of the player object 62 (special handle 66) is suspended in a step S83. That is, it is determined whether in response to the player turning the A button 22 or the operation buttons 26 and 28 on, the player object 62 holds the handle in both hands or not (holds the special handle 66 in a left hand or a right hand), or whether or not in response to the player turning the operation button 26 or/and the operation button 28 off, the player object 62 releases the special handle 66.

If "NO" in a step S83, that is, if the rotation of the player object 62 is not suspended, the process directly returns to the step S75. On the other hand, if "YES" in the step S83, that is, if the rotation of the player object 62 is suspended, the image change processing (1) is directly returned.

It is noted that as described above, in a case that the blocking bar 68 is opened or closed depending on the rotation direction, for rotation in one direction, the variable n is incremented, and for rotation in another direction, the variable n is decremented. Furthermore, when the variable n is equal to the predetermined number of times m, the blocking bar 68 is opened. Until the variable n is equal to the predetermined number of times m, the blocking bar 68 has been closed, and after the blocking bar 68 is opened once, when the variable n becomes 0, the blocking bar 68 may be closed.

Figure 19:
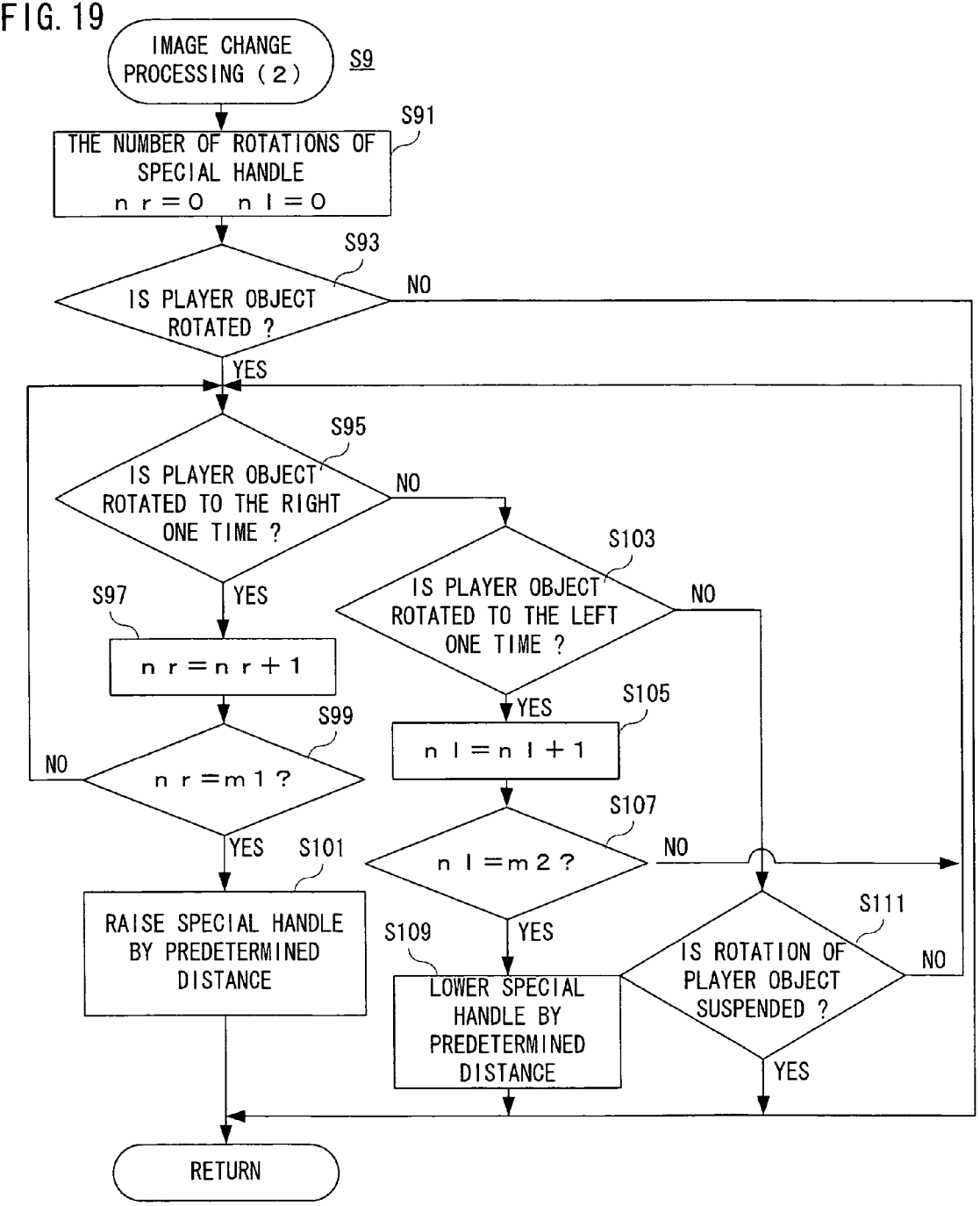
FIG. 19 is a flowchart showing an image change processing (2) of the CPU shown in FIG. 2.

Furthermore, in a case that the player object 62 holds the special handle 70, the image change processing (2) shown in FIG. 19 is selected, and the number of rotations of the special handle is initialized in a step S91. More specifically, 0 is substituted into each of the variables of the number of rotations to the right nr and the number of rotations to the left nl (nr=0, nl=0).

In a next step S93, it is determined whether or not the player object 62 rotates. The process in the step S93 is the same as the above-described process in the step S73, and therefore a detailed description will be omitted here. If "NO" in the step S93, that is, if the player object 62 does not rotate, the image change processing (2) is directly returned.

On the other hand, if "YES" in the step S93, that is, if the player object 62 rotates, it is determined whether or not the player object 62 (or special handle 70) rotates to the right one time in a step S95. Whether or not to rotate to the right is determined depending on whether or not the clockwise rotation flag is turned on, and whether or not to rotate one time is determined in a manner similar to the above-described determination in the step S75.

If "NO" in the step S95, that is, if the player object 62 does not rotate to the right one time, the process proceeds to a step S103. On the other hand, if "YES" in the step S95, that is, if the player object 62 rotates to the right one time, the variable nr is incremented in the step S97 (nr=nr+1). In a next step S99, it is determined whether or not the number of rotations to the right nr of the player object 62 is equal to the predetermined number of times m1 (two, in this embodiment). If "NO" in the step S99, that is, if the number of rotations nr is not equal to the predetermined number of times m1, the process directly returns to the step S95.

On the other hand, if "YES" in the step S99, that is, if the number of rotations nr is equal to the predetermined number of times m1, the special handle 70 is raised by a predetermined distance in a step S101, then the image change processing (2) is returned. At this time, if the player object 62 remains holding the special handle 70, the player object 62 is also raised together with the special handle 70.

Furthermore, in the step S103, it is determined whether or not the player object 62 rotates to the left one time. Here, whether or not to rotate to the left depends on whether or not the counterclockwise rotation flag is turned on, and whether or not to rotate one time is determined in a manner similar to the above-described process in the step S75. If "NO" in the step S103, that is, if the player object 62 does not rotate to the left one time, the process proceeds to a step S11. On the other hand, if "YES" in the step S103, that is, if the player object 62 rotates to the left one time, the variable nl is incremented in a step S105 (nl=nl+1).

Then, in a following step S107, it is determined whether or not the number of rotations to the left nl is equal to the predetermined number of times m2 (two in this embodiment). If "NO" in the S107, that is, if the number of rotations to the left nl is not equal to the predetermined number of times m2, the process directly returns to the step S95. On the other hand, if "YES" in the step S107, that is, if the number of rotations to the left n1 is equal to the predetermined number of times m2, the special handle 70 is lowered by a predetermined distance in a step S109, and the image change processing (2) is returned. At this time, if the player object 62 remains holding the special handle 70, the player object 62 is also lowered together with the special handle 70.

In a step S111, it is determined whether or not the player object 62 stops rotating. This determination is the same as the above-described process in the step S83. If "NO" in the step S1, that is, if the player object 62 does not stop rotating, the process directly returns to the step S95. On the other hand, if "YES" in the step S111, that is, if the player object 62 stops rotating, the image change processing (2) is returned.

Figure 20:
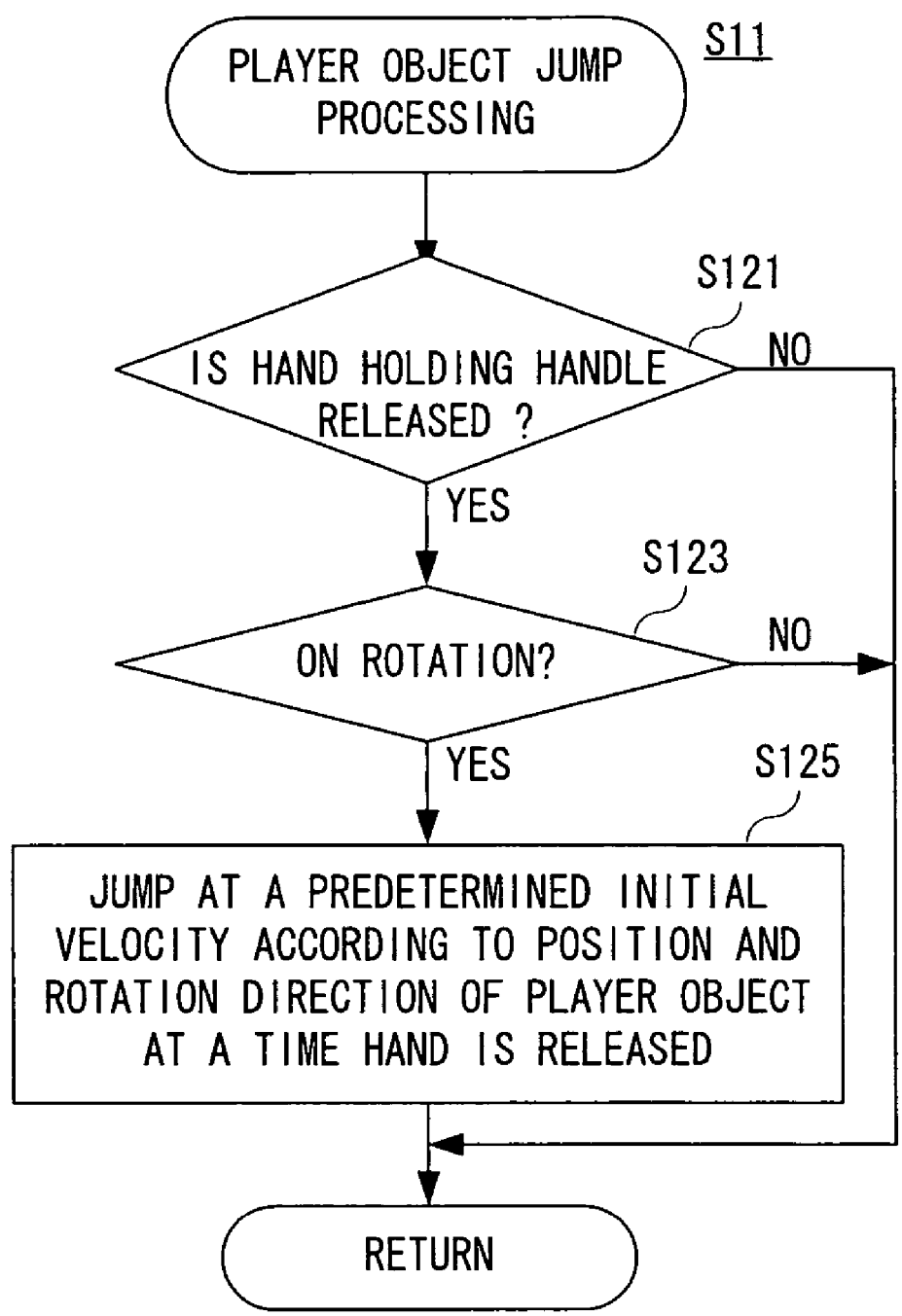
FIG. 20 is a flowchart showing a player object jump processing of the CPU shown in FIG. 2.

When the player object jump processing in the step S11 shown in FIG. 15 is started, it is determined whether or not the hand is released from the handle in a step S121 shown in FIG. 20. That is, it is determined whether or not a state in which any one of the left hand flag or the right hand flag is turned on is shifted to a state in which both of the flags are turned off. If "NO" herein, that is, if any one of the left hand flag and the right hand flag is turned on, it is determined that the hand is not released from the handle, and the player object jump processing is directly returned.

On the other hand, if "YES", that is, if a state in which any one of the left hand flag and the right hand flag is turned on is shifted to a state in which both of the flags are turned off, it is determined that the hand is released from the handle, and in a step S123, it is determined whether or not the player object 62 is in rotation. That is, it is determined whether or not the counterclockwise rotation flag or the clockwise rotation flag is turned on.

In "NO" in the step S123, that is, if both of the counterclockwise rotation flag and the clockwise rotation flag are turned off, the player object 62 is determined to be not in rotation, and the player object jump processing is directly returned.

It is noted that in a case that both the left hand flag and the right hand flag are turned off, "NO" is determined in the above-described step S121.

On the other hand, if "YES" in the step S123, that is, if any one of the counterclockwise rotation flag and the clockwise rotation flag is turned on, the player object 62 is determined to be in rotation. In a step S125, the player object jumps at the predetermined initial velocity on the basis of the position and the rotation direction of the player object at a time that the hand is released, and then the player object jump processing is returned. Here, the rotation direction is detected by the counterclockwise rotation flag or the clockwise rotation flag, and the signs of the X component and the Y component at the initial velocity Vo are determined from the central coordinates of the handle held by the player object 62 and the position coordinates of the player object 62 at a time of jumping on the basis of the table 1 or 2. Furthermore, at this time, the initial velocity Vo is, in general, coincident with the rotational velocity Vr of the player object 62. However, in a case that, in the above-described object rotation processing, the rotational velocity Vr is changed, the changed rotational velocity becomes the initial velocity Vo. Accordingly, by use of the equations 3 and 4, the position of the player object 62 after the predetermined time period (one frame (1/60 seconds) in this embodiment) is calculated, and the player object 62 is moved to the calculated position. It is noted that, as described above, the position of the player object 62 is the central position of the head.

Figure 21:
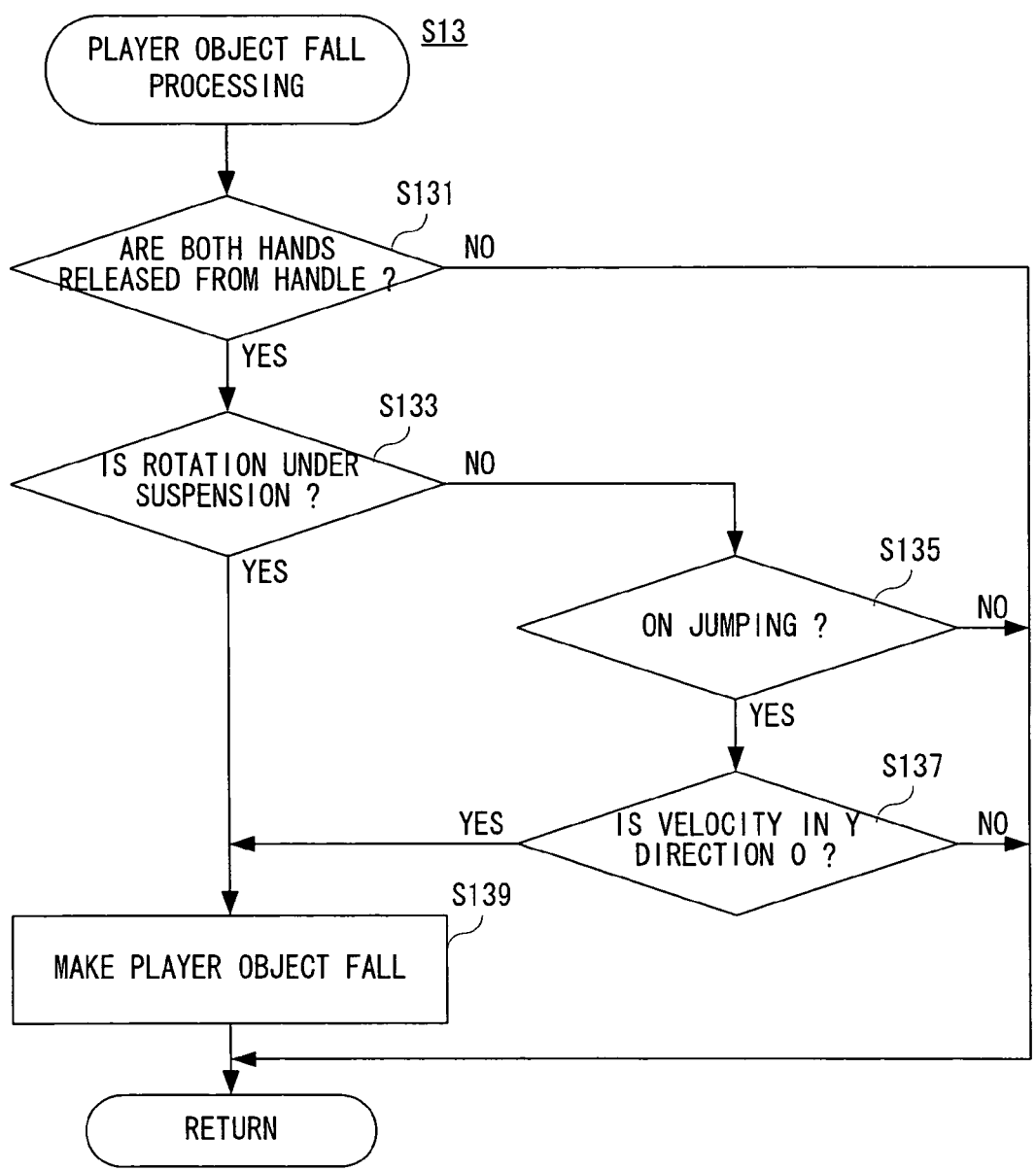
FIG. 21 is a flowchart showing a player object fall processing of the CPU shown in FIG. 2.

When the player object fall processing in the step S13 shown in FIG. 15 is started, it is determined whether or not both hands are released from the handle in a step S131 as shown in FIG. 21. That is, this determination is made depending on whether the left hand flag and the right hand flag are turned off.

If "NO" in the step S131, that is, if at least any one of the left hand flag and the right hand flag is turned on, it is determined that both hands are not released from the handle, and the player object fall processing is directly returned. On the other hand, if "YES" in the step S131, that is, if both the left hand flag and the right hand flag are turned off, it is determined that both hands are released from the handle, and it is determined whether or not the rotation of the player object 62 is under suspension in a step S133. That is, it is determined whether or not the under-suspension flag is turned on.

If "YES" in the step S133, that is, if the under-suspension flag is turned on, it is determined that the rotation of the player object 62 is suspended, and the process directly proceeds to a step S139. On the other hand, if "NO" in the step S133, that is, if the under-suspension flag is turned off, it is determined that the rotation of the player object 62 is not suspended, and it is determined, in a step 135, whether or not the player object 62 is jumping. That is, it is determined whether or not the jumping flag is turned on.

If "NO" in the step S135, that is, if the jumping flag is turned off, the player object 62 is determined not to be jumping, and the player object fall processing is directly returned. It is noted that in a case that both hands are released from the handle, and the player object is not in rotation and jumping, a case where the player object 62 rides on the blocking bar 68, or falls into the game over position is considered, for example.

On the other hand, if "YES" in the step S135, that is, if the jumping flag is turned on, the player object 62 is determined to be jumping, and it is determined whether or not the velocity in the Y direction (Vy) becomes 0 in a step S137. If "NO" in the step S137, that is, if the velocity in the Y direction does not become 0, the falling process of the player object 62 is directly returned. However, if "YES" in the step S137, that is, if the velocity in the Y direction becomes 0, the process proceeds to the step S139.

In the step S139, the player object 62 is made to fall, and the player object fall processing is returned. In the step S139, in a case of making the player object 62 fall from the rotation suspended state, the position of the player object 62 is updated according to the free falling movement, and in a case of making the player object 62 fall from the on-jumping state, the position of the player object 62 is updated according to the diagonally-projected (including the horizontally-projected and the vertically-projected in this embodiment) movement.

According to this embodiment, merely by utilizing the two operation buttons provided on the one controller by the player, the player object is rotated and jumped, to be moved, allowing easy operation of the player object.

Furthermore, the player object is rotated, and according to the angle of the rotation, the moving direction of the player object is arbitrarily changed, providing enjoyable unexpectedness of the movement of the player object. That is, it is possible to improve the game.

In addition, according to the rotating movement of the player object, the game image (game screen) is changed, thus preventing the game from being monotonous and preventing the decrease of interest in the game.

It is noted that in the above-described embodiment, two kinds of special handles are prepared. However, it may be possible that three or more kinds of special handles are prepared to change the image, depending on the (number of)

rotations of each of the special handles (player object). For example, it may be possible that when the player object rotates the predetermined number of times while holding a certain special handle, changes of the image such as generating a warp (acceleration) zone on the game space, increasing or decreasing the number of the handles, making the player object invincible, changing the size of the player object, generating a wall to prevent the player object from falling, and so forth are provided. It is noted that it is also conceivable that such the image changes are restricted to only the constant time period. Furthermore, it is also possible that by keeping the blocking bar 68 described above open or moving the special handle 70 up and down by the predetermined distance during the constant time period, and after a lapse of a predetermined time period, the blocking bar 68 may be closed, or the special handle 70 may be returned to the original position.

Furthermore, although in the above-described embodiment, the description is made on the hand-held-typed game machine, it is not necessary to be restricted thereto. For example, it is also applicable to video game apparatuses for home use and cellular phones having a game function. In such a case, providing or assigning buttons corresponding to the L button and the R button to the operating portion (controller), it is possible to readily operate them.

In addition, various information recording medium such as an optical information recording medium including a CD-ROM, a DVD, etc., a magneto-optical disk, a magnetic disk, or the like are applicable in place of the game cartridge.

Although the example embodiment presented herein has been described and illustrated in detail, it is clearly understood that the same is by way of illustration and example only and is not to be taken by way of limitation, the spirit and scope of the present embodiments being limited only by the terms of the appended claims.

The invention claimed is:

1. A game apparatus for displaying game images, including at least a player object and a plurality of non-player objects to be held by the player object in a game space, wherein a non-player object may be held by at least one of the left hand or the right hand of a player object, comprising:
    an operating element having at least a first operating portion and a second operating portion to be operated by a player;
    first determining programmed logic circuitry which determines whether or not said non-player object is co-located with a right hand of said player object when said first operating portion is operated by said player;
    second determining programmed logic circuitry which determines whether or not said non-player object is co-located with a left hand of said player object when said second operating portion is operated by said player;
    right hand action processing programmed logic circuitry which acts such that said non-player object is held by said right hand of said player object when said first determining programmed logic circuitry determines that said non-player object and said right hand of said player object are co-located;
    left hand action processing programmed logic circuitry which acts such that said non-player object is held by said left hand of said player object when said second determining programmed logic circuitry determines that said non-player object and said left hand of said player object are co-located;
    hand deciding programmed logic circuitry which decides a hand that said player object holds said non-player object by at least one of said right hand action processing programmed logic circuitry and said left hand action processing programmed logic circuitry is the right hand or the left hand; and
    rotation processing programmed logic circuitry which rotates, when said hand deciding programmed logic circuitry decides that the hand that said player object holds said non-player object is the right hand or the left hand, said player object about the right hand or the left hand holding said non-player object in a direction that is set in correspondence to the right hand or the left hand.

2. A game apparatus according to claim 1, further comprising a jump processing mechanism which, while said player object is rotated by said rotation processing mechanism when the hand holding said non-player object is released by an operation of said first operating portion or said second operating portion, jumping said player object on the basis of a position and a rotation direction of said player object at that time.

3. A game apparatus according to claim 1, further comprising a suspension processing mechanism which suspends said player object on the moment when said player object holds said non-player object with both hands by said right hand action processing mechanism and said left hand action processing mechanism.

4. A game apparatus according to claim 3, wherein said operating mechanism further includes a third operating portion, and said suspension processing mechanism, when said player object is rotated by said rotation processing mechanism, suspends the rotation of said player object in response to an operation of said third operating portion.

5. A game apparatus according to claim 3, further comprising a fall processing mechanism which makes said player object fall when both hands holding said non-player object are released in response to an operation of at least any one of said first operating portion and said second operating portion while said player object is suspended by said suspension processing mechanism, or when a velocity in a vertically upward direction of said player object becomes 0 after said player object jumps by said jump processing mechanism.

6. A game apparatus according to claim 1, wherein said rotation processing mechanism includes a rotational velocity changing mechanism for changing a rotational velocity of said player object when at least a predetermined condition according to a progress of the game is satisfied.

7. A game apparatus according to claim 1, further comprising
    number of rotations detecting programmed logic circuitry which detects the number of rotations of said player object, and
    image change processing programmed logic circuitry which provides changes to said game image when the number of rotations detected by said number of rotations detecting programmed logic circuitry reaches a predetermined number of times.

8. A game apparatus according to claim 1, wherein
    said player object is displayed so as to turn its back to the player, and
    said rotation processing programmed logic circuitry rotates said player object to the right about said right hand when said player object holds said non-player object with said right hand by said right hand action processing programmed logic circuitry, and rotates said player object to the left about said left hand when said player object holds said non-player object with said left hand by said left hand action processing programmed logic circuitry.

9. A game apparatus according to claim 7, wherein
said number of rotations detecting programmed logic circuitry detects the number of rotations of said player object to the right and to the left, and
said image change processing programmed logic circuitry provides a different image change depending on whether it is detected that the number of rotations to the right detected by said number of rotations detecting programmed logic circuitry reaches said predetermined number of times or whether it is detected that the number of rotations to the left detected by said number of rotations detecting programmed logic circuitry reaches said predetermined number of times.

10. A game apparatus according to claim 1, further comprising
a housing formed in a shape capable of being held with both hands, wherein said first operating portion is arranged at a position operable by a finger of said right hand of said player, and said second operating portion is arranged at a position operable by a finger of said left hand of said player.

11. A game apparatus for displaying game images, including at least a player object and a plurality of non-player objects to be held by the player object in a game space, wherein a non-player object may be held by at least one of the left hand or the right hand of a player object, comprising:
an operating element having at least a first operating portion and a second operating portion to be operated by a player;
first determining programmed logic circuitry which determines whether or not said non-player object is co-located with a right hand of said player object when said first operating portion is operated by said player;
second determining programmed logic circuitry which determines whether or not said non-player object is co-located with a left hand of said player object when said second operating portion is operated by said player;
right hand action processing programmed logic circuitry which acts such that said non-player object is held by said right hand of said player object when said first determining programmed logic circuitry determines that said non-player object and said right hand of said player object are co-located;
left hand action processing programmed logic circuitry which acts such that said non-player object is held by said left hand of said player object when said second determining programmed logic circuitry determines that said non-player object and said left hand of said player object are co-located;
rotation processing programmed logic circuitry which rotates at least said player object when said player object holds said non-player object with either hand responsive to said right hand action processing programmed logic circuitry or said left hand action processing programmed logic circuitry; and
non-player object controlling programmed logic circuitry which controls at least an action of said non-player object as said player object is rotated by said rotation processing programmed logic circuitry.

12. A game apparatus according to claim 11, further comprising number of rotations detecting programmed logic circuitry which detects the number of rotations of said player object, wherein
said rotation processing programmed logic circuitry rotates said non-player object to the right when said player object holds said non-player object with said right hand by said right hand action processing programmed logic circuitry, and rotates said non-player object to the left when said player object holds said non-player object with said left hand by said left hand action processing programmed logic circuitry,
said number of rotations detecting programmed logic circuitry detects the number of rotations to the right and the number of rotations to the left of said player object, and
said non-player object controlling programmed logic circuitry makes said non-player object a different action depending on whether it is detected that the number of rotations to the right, detected by said number of rotations detecting programmed logic circuitry, reaches said predetermined number of times or whether it is detected that the number of rotations to the left, detected by said number of rotations detecting programmed logic circuitry, reaches said predetermined number of times.

13. A game apparatus according to claim 11, wherein
said non-player object controlling programmed logic circuitry makes the non-player object different from the non-player object that said player holds an action different from the rotation of said player object as said player object is rotated by said rotation programmed logic circuitry.

14. A game apparatus for displaying game images, including at least a player object and a plurality of non-player objects to be held by the player object in a game space, wherein a non-player object may be held by at least one of the left hand or the right hand of a player object, comprising:
an operating element to be operated by a player;
determining programmed logic circuitry which determines whether or not said non-player object is co-located with a hand of said player object when said operating element is operated by said player;
action processing programmed logic circuitry which acts such that said player object holds said non-player object with said hand when said determining programmed logic circuitry determines that said non-player object and said hand of said player object are co-located;
rotation processing programmed logic circuitry which rotates at least said player object when said player object holds said non-player object with the hand by said action processing programmed logic circuitry; and
non-player object controlling programmed logic circuitry which controls at least an action of said non-player object as said player object is rotated by said rotation processing programmed logic circuitry.

15. A storage medium storing a game program of a game apparatus that displays game images, including at least a player object and a plurality of non-player objects to be held by the player object in a game space, wherein a non-player object may be held by at least one of the left hand or the right hand of a player object, and is provided with an operating element having at least a first operating portion and a second operating portion to be operated by a player,
said game program causes a processor of said game apparatus to execute first determining which determines whether or not said non-player object is co-located with a right hand of said player object when said first operating portion is operated by said player;
second determining which determines whether or not said non-player object is co-located with a left hand of said player object when said second operating portion is operated by said player;
right hand action processing which acts such that said non-player object is held by said right hand of said player object when said first determining determines that said non-player object and said right hand of said player object are co-located;

left hand action processing which acts such that said non-player object is held by said left hand of said player object when said second determining determines that said non-player object and said right hand of said player object are co-located;

hand deciding which decides a hand that said player object holds said non-player object by at least one of said right hand action processing and said left hand action processing is the right hand or the left hand; and rotation processing which rotates when said hand deciding decides that said player object holds said non-player object by the right hand or the left hand, said player object about the right hand or the left hand holding said non-player object in a direction that is set in correspondence to the right hand or the left hand.

16. A storage medium storing a game program according to claim 15, wherein said game program further executes a jump processing step which, while said player object is rotated by said rotation processing step when the hand holding said non-player object is released by an operation of said first operating portion or said second operating portion, jumps said player object on the basis of a position and a rotation direction of said player object at that time.

17. A storage medium storing a game program according to claim 15, wherein said game program executes a suspension processing step which suspends said player object on the moment when said player object holds said non-player object with both hands by said right hand action processing step and said left hand action processing step.

18. A storage medium storing a game program according to claim 17, wherein said operating step further includes a third operating portion, and said suspension processing step suspends, when said player object is rotated by said rotation processing step, a rotation of said player object in response to an operation of said third operating portion.

19. A storage medium storing a game program according to claim 17, wherein said game program further executes a fall processing step which makes said player object fall when the both hands holding said non-player object are released in response to an operation of at least any one of said first operating portion and said second operating portion while said player object is suspended by said suspension processing step, or when a velocity in a vertically upward direction of said player object becomes 0 after said player object jumps by said jump processing step.

20. A storage medium storing a game program according to claim 15, wherein said rotation processing step includes a rotational velocity changing step which changes a rotational velocity of said player object when at least a predetermined condition according to a progress of the game is satisfied.

21. A storage medium storing a game program according to claim 15, wherein said game program further executes number of rotations detecting which detects the number of rotations of said player object, and image change processing which provides changes to said game image when the number of rotations by said number of rotations detecting reaches a predetermined number of times.

22. A storage medium storing a game program according to claim 15, wherein said player object is displayed so as to turn its back to the player, and said rotation processing rotates said player object to the right about said right hand, when said player object holds said non-player object with said right hand by said right hand action processing, and rotates said player object to the left about said left hand, when said player object holds said non-player object with said left hand by said left hand action processing.

23. A storage medium storing a game program according to claim 21, wherein said number of rotations detecting detects the number of rotations to the right and the number of rotations to the left of said player object, said image change processing step provides a different image change depending on whether it is detected that the number of rotations to the right, detected by said number of rotations detecting, reaches said predetermined number of times, or whether it is detected that the number of rotations to the left, detected by said number of rotations detecting, reaches said predetermined number of times.

24. A storage medium storing a game program of a game apparatus that displays game images, including at least a player object and a plurality of non-player objects to be held by the player object in a game space, wherein a non-player object may be held by at least one of the left hand or the right hand of a player object, and is provided with an operating element having at least a first operating portion and a second operating portion to be operated by a player, said game program causes a processor of said game apparatus to execute:

first determining which determines whether or not said non-player object is co-located with a right hand of said player object when said first operating portion is operated by said player;

second determining which determines whether or not said non-player object is co-located with a left hand of said player object when said second operating portion is operated by said player;

right hand action processing which acts such that said non-player object is held by said right hand of said player object when said first determining determines that said non-player object and said right hand of said player object are co-located;

left hand action processing which acts such that said non-player object is held by said left hand of said player object when said second determining determines that said non-player object and said left hand of said player object are co-located;

rotation processing which rotates at least said player object when said player object holds said non-player object with either hand responsive to said right hand action processing or said left hand action processing;

non-player object controlling which controls at least an action of said non-player object as said player object is rotated by said rotation processing.

25. A storage medium storing a game program according to claim 24, said game program causes the processor of said game apparatus to further execute number of rotations detecting which detects the number of rotations of said player object wherein said rotation processing rotates said non-player object to the right when said player object holds said non-player object with said right hand by said right hand action processing, and rotates said non-player object to the left when said player object holds said non-player object with said left hand by said left hand action processing, said number of rotations detecting detects each of the number of rotations to the right and the number of rotations to the left of said player object, and said non-player object controlling makes said non-player object a different action depending on whether it is detected that the number of rotations to the right, detected by said number of rotations detecting, reaches said predetermined number of times or when it is detected that the number of rotations to the left, detected by said number of rotations detecting, reaches said predetermined number of times.

26. A storage medium according to claim 24, wherein said non-player object controlling makes the non-player object different from the non-player object that said player holds an action different from the rotation of said player object as said player object is rotated by said rotation programmed logic circuitry.

27. A storage medium storing a game program of a game apparatus that displays game images, including at least a player object and a plurality of non-player objects to be held by the player object in a game space, wherein a non-player object may be held by at least one of the left hand or the right hand of a player object, and is provided with an operating element to be operated by a player, said game program causes a processor of said game apparatus to execute:

determining which determines whether or not said non-player object is co-located with a hand of said player object when said operating element is operated by said player;

action processing which acts such that said non-player object is held by said hand of said player object when said determining determines that said non-player object and said hand of said player object are co-located;

rotation processing which rotates at least said player object when said player object holds said non-player object with the hand by said action processing and;

non-player object controlling which controls at least an action of said non-player object as said player object is rotated by said rotation processing.

* * * * *